US009141600B2

(12) United States Patent
Tromp

(10) Patent No.: US 9,141,600 B2
(45) Date of Patent: Sep. 22, 2015

(54) COMPUTER ARRANGEMENT FOR AND COMPUTER IMPLEMENTED METHOD OF DETECTING POLARITY IN A MESSAGE

(75) Inventor: Erik Tromp, Uden (NL)

(73) Assignee: INSITE INNOVATIONS AND PROPERTIES B.V. (NL)

( * ) Notice: Subject to any disclaimer, the term of this patent is extended or adjusted under 35 U.S.C. 154(b) by 645 days.

(21) Appl. No.: 13/547,963

(22) Filed: Jul. 12, 2012

(65) Prior Publication Data

US 2014/0019118 A1    Jan. 16, 2014

(51) Int. Cl.
*G06F 17/27* (2006.01)

(52) U.S. Cl.
CPC .................................. *G06F 17/274* (2013.01)

(58) Field of Classification Search
CPC ............. G10L 25/63; G10L 2021/105; G06F 17/2785; G06F 17/3053; G06F 17/30616; G06F 17/30719; G06F 17/2765; G06F 17/277; G06F 17/28; G06F 17/30554; G06F 17/21; G06F 17/30705; G06F 17/30713; G06F 17/30731
See application file for complete search history.

(56) References Cited

U.S. PATENT DOCUMENTS

| | | | |
|---|---|---|---|
| 6,216,102 B1 | 4/2001 | Martino et al. | |
| 8,533,208 B2 * | 9/2013 | Sundaresan et al. | 707/755 |
| 8,788,270 B2 * | 7/2014 | Patel et al. | 704/270.1 |
| 2002/0062297 A1 * | 5/2002 | Mizokawa | 706/15 |
| 2003/0004652 A1 * | 1/2003 | Brunner et al. | 702/19 |
| 2005/0091038 A1 * | 4/2005 | Yi et al. | 704/10 |
| 2006/0069589 A1 * | 3/2006 | Nigam et al. | 705/1 |
| 2008/0201144 A1 * | 8/2008 | Song et al. | 704/236 |
| 2008/0270116 A1 * | 10/2008 | Godbole et al. | 704/9 |
| 2009/0112892 A1 * | 4/2009 | Cardie et al. | 707/100 |
| 2009/0125371 A1 * | 5/2009 | Neylon et al. | 705/10 |
| 2009/0193011 A1 * | 7/2009 | Blair-Goldensohn et al. | 707/5 |
| 2009/0265307 A1 * | 10/2009 | Reisman et al. | 707/2 |
| 2009/0319436 A1 * | 12/2009 | Andra et al. | 705/80 |
| 2010/0257117 A1 * | 10/2010 | Shvadron et al. | 705/36 R |
| 2010/0312769 A1 * | 12/2010 | Bailey et al. | 707/740 |
| 2010/0332287 A1 * | 12/2010 | Gates et al. | 705/10 |
| 2011/0078167 A1 * | 3/2011 | Sundaresan et al. | 707/765 |
| 2011/0141258 A1 * | 6/2011 | Song et al. | 348/77 |
| 2011/0225174 A1 * | 9/2011 | Artzt et al. | 707/750 |
| 2011/0246179 A1 * | 10/2011 | O'Neil | 704/9 |
| 2012/0089396 A1 * | 4/2012 | Patel et al. | 704/249 |
| 2012/0101808 A1 * | 4/2012 | Duong-Van | 704/9 |
| 2012/0197903 A1 * | 8/2012 | Lu et al. | 707/748 |
| 2012/0271788 A1 * | 10/2012 | Fang et al. | 706/50 |

(Continued)

OTHER PUBLICATIONS

Wilson et al. "Recognizing Contextual Polarity: An Exploration of Features for Phrase-Level Sentiment Analysis", Association for computational linguistics, 2009, vol. 35, pp. 1-36.*

(Continued)

*Primary Examiner* — Abdelali Serrou
(74) *Attorney, Agent, or Firm* — Tucker Ellis LLP

(57) ABSTRACT

The present invention relates to automatic sentiment analysis by a computer arrangement and a computer implemented method. A message is presented to the computer arrangement which stores a set of patterns. Each pattern has a word and an associated part-of-speech tag. The message is compared against the patterns as stored in memory rendering a set of matching patterns. The set of matching patterns is then processed in accordance with a set of rules taking into account presence of patterns in the message that may add to a positive polarity and negative polarity, and patterns that may amplify, attenuate or flip such positive polarity or negative polarity.

18 Claims, 5 Drawing Sheets

(56) References Cited

U.S. PATENT DOCUMENTS

| | | | |
|---|---|---|---|
| 2013/0103385 A1* | 4/2013 | Ghosh et al. | 704/9 |
| 2013/0103386 A1* | 4/2013 | Zhang et al. | 704/9 |
| 2013/0159277 A1* | 6/2013 | Liu et al. | 707/709 |
| 2014/0114655 A1* | 4/2014 | Kalinli-Akbacak | 704/231 |

OTHER PUBLICATIONS

Li et al. "Sentiment Classification and Polarity Shifting", Association for computational linguistics, 2010, pp. 635-643.*

Wilson et al., Recognizing Contextual Polarity in Phrase-Level Sentiment Analysis, Oct. 2005, pp. 1-8.*

Kennedy et al., Sentiment Classification of Movie Reviews Using Contextual Valence Shifters, Computational Intelligence, vol. 22, No. 2, May 2006, pp. 1-23.*

Tato, R., et al., "Emotional Space Improves Emotion Recognition," Proceedings of the 7.sup.th International Conference on Spoken Language Processing, Denver, CO, Sep. 16-20, 2002, pp. 2029-2032.*

Liscombe, J., et al., "Classifying Subject Ratings of Emotional Speech Using Acoustic Features," Proceedings of Eurospeech 2003, Geneva, Switzerland, Sep. 1-4, 2003, pp. 725-728.*

Ku, et al., Opinion Extraction, Summarization, and Tracking in News and Blog Corpa, 2006, pp. 1-8.*

Hu et al., Mining Opinion Features in Customer Reviews, 2004, pp. 755-760.*

Ahmed et al., Language identification from text using n-gram based cumulative frequency addition, Proceedings of Student/Faculty Research Day, CSIS, Pace University, May 7, 2004, pp. 12.1-12.8.

Brill, A simple rule-based part of speech tagger, Proceedings of the third conference on Applied natural language processing, 1992, pp. 112-116, Philadelphia, PA.

Butterworth, et al, A greedy algorithm for supervised discretization, Journal of Biomedical Informatics—Special issue: Biomedical machine learning, Aug. 27, 2004, pp. 285-292, vol. 37, Elsevier Inc.

Cavnar, et al., N-gram-based text categorization, Proceedings of the 3rd Symposium on Document Analysis and Information Retrieval (SDAIR-94), 1994, 14 pages.

Cowie et al., Language recognition for mono-and multi-lingual documents, Proceedings of the Vextal Conference, 1999, 9 pages.

Cutting et al., A practical part-of-speech tagger, Proceedings of the Third Conference on Applied Natural Language Processing, 1992, pp. 133-140, Xerox Palo Alto Research Center, Palo Alto, CA.

Dougherty et al., Supervised and unsupervised discretization of continuous features, Proceedings of the Twelfth International Conference on Machine Learning, 1995, 9 pages, Morgan Kaufmann Publishers, San Francisco, CA.

Dunning, Statistical identification of language, TR-MCCS-94-273, Mar. 10, 1994, 31 pages.

Baccianella, et al., Sentiwordnet 3.0: An enhanced lexical resource for sentiment analysis and opinion mining, Proceedings of the Seventh conference on International Language Resources and Evaluation LREC'10, 2010, pp. 2200-2204, Italy.

Esuli, et al., Determining term subjectivity and term orientation for opinion mining, Proceedings EACL-06, 11th Conference of the European Chapter of the Association for Computational Linguistics, 2006, pp. 193-200, Italy.

Freund, et al., A decision-theoretic generalization of on-line learning and an application to boosting, 1995, 35 pages, AT & T Labs, Florham Park, NJ.

Go, et al., Twitter sentiment analysis, 2009, 17 pages.

Goldwater, et al., A fully bayesian approach to unsupervised part-of-speech tagging, Proceedings of the 45th Annual Meeting of the Association of Computational Linguistics, 2007, pp. 744-751, Czech Republic.

Teahan, et al., Using compression-based language models for text categorization, Proceedings Workshop on Language Modeling and Information Retrieval, 2001, 5 pages, United Kingdom.

Hatzivassiloglou, et al., Predicting the semantic orientation of adjectives, Proceedings of the ACL, 1997, pp. 174-181, Columbia University, New York City.

Joachims, Text categorization with support vector machines: Learning with many relevant features, Proceedings of the European Conference on Machine Learning, EC114-4, Apr. 19, 1998, 18 pages, Germany.

Joachims, Making large-scale support vector machine learning practical, Advances in Kernel Methods—Support Vector Learning, 1999, 17 pages, MIT Press, Cambridge.

Kupiec, Robust part-of-speech tagging using a hidden Markov model, Computer Speech and Language, 1992, pp. 225-242, vol. 6, Palo Alto.

Lafferty, et al., Conditional random fields: Probabilistic models for segmenting and labeling sequence data, Proceedings of the 18th International Conference on Machine Learning, Jun. 28, 2001, pp. 282-289.

O'Connor, et al., From tweets to polls: Linking text sentiment to public opinioin time series, Proceedings of the International AAAI Conference on Weblogs and Social Media, Jan. 1, 2010, 9 pages.

Pak, et al., Twitter as a corpus for sentiment analysis and opinion mining, Proceedings of LREDC 2010, 2010, pp. 1320-1326.

Pang, et al., A sentimental education: Sentiment analysis using subjectivity summarization based on minimum cuts, Proceedings of the ACL, 2004, pp. 271-278, Ithaca.

Pang, et al., Opinion mining and sentiment analysis, Foundations and Trends in Information Retrieval 2(1-2), 2008, 130 pages, vol. 2.

Pang, et al., Thumbs up? Sentiment classification using machine learning techniques, Proceedings of EMNLP02, Jul. 2002, pp. 79-86, Philadelphia.

Prager, Linguini: Language identification for multilingual documents, Proceedings of the 32nd Hawaii International Conference on System Sciences, 1999, 22 pages.

Read, Using emoticons to reduce dependency in machine learning techniques for sentiment classification, ACL student '05 Proceedings of the ACL Student Research Workshop, Jun. 27, 2005, 167 pages, Ann Arbor.

Riloff, et al., Learning subjective nouns using extraction pattern bootstrapping, Proceedings of the 7th Conference on Natural Language Learning, May-Jun. 2003, pp. 25-32.

Schapire, et al., BoosTexter: A boosting-based system for text categorization, Machine Learning, 2000, pp. 135-168, vol. 39.

Schmid, Probabilistic part-of-speech tagging using decision trees, International Conference on New Methods in Language Processing, 1994, 9 pages, Germany.

Sindhwani, et al., Document-word co-regularization for semi-supervised sentiment analysis, Eighth IEEE International Conference on Data Mining, 2008, 11 pages, Yorktown Heights.

Tromp, et al., Graph-based n-gram language identification on short texts, Proceedings of the 20th Machine Learning conference of Belgium and The Netherlands, 2011, 8 pages, The Netherlands.

Tromp, Multilingual Sentiment Analysis on Social Media, Master's Thesis, Department of Mathematics and Computer Sciences, Eindhoven University of Technology, Jul. 2011, 110 pages.

Wiebe et al., Word sense and subjectivity, Proceedings of ACL06, 2006, pp. 1065-1072.

Wiebe et al., Annotating expressions of opinions and emotions in language, Language Resources and Evaluation (formerly Computers and the Humanities), 2005, 52 pages, Kluwer Academic Publishers, The Netherlands.

Wilson et al., Recognizing contextual polarity in phrase-level sentiment analysis, HLT '05: Proceedings of the conference on Human Language Technology and Empirical Methods in Natural Language Processing, 2005, pp. 347-354, Vancouver, Canada.

Baccianella, et al., Sentiwordnet 3.0: An enhanced lexical resource for sentiment analysis and opinion mining, Proceedings of the Seventh Conference on International Language Resources and Evaluation (LREC'10), May 2010, 5 pages.

Teahan, et al., Using compression-based language models for text categorization, Proceedings of 2001 Workshop on Language Modeling and Information Retrieval, 2001, 5 pages, The Robert Gordon University, Scotland, UK.

* cited by examiner

COMPUTER ARRANGEMENT FOR AND COMPUTER IMPLEMENTED METHOD OF DETECTING POLARITY IN A MESSAGE

This application is based on investigations performed in the context of a Master's study at the Eindhoven University of Technology. The results of that study are presented in [Tromp, Jul. 16, 2011] the entire content of which is hereby incorporated by reference in its entirety.

FIELD OF THE INVENTION

In this document, the problem of sentiment analysis is addressed. Sentiment analysis is the process of automatically determining sentiment expressed in natural language. The term sentiment is a broad one, varying from emotions to personal experiences. In this document we are concerned with a particular subset of sentiment, the "opinions". The problem we hence study is to determine a polarity of a general opinion expressed in texts written in natural language. Sentiment can be expressed as being either positive, negative, neutral or objective.

The invention relates to computer arrangement for and computer implemented method of detecting such a polarity in a message.

BACKGROUND OF THE INVENTION

We investigate automated sentiment analysis on multilingual data from social media. As social media more and more connect the entire world, there is an increasing importance to analyze multilingual data rather than unilingual data. The automated sentiment analysis we perform extracts opinions from the relatively short messages placed on social media in multiple languages.

SUMMARY OF THE INVENTION

The object of the present invention is to provide an improvement in such automated sentiment analysis.

To that end, the present application provides computer arrangement provided with a processor and memory, the memory storing a computer program comprising instructions and data, the processor being arranged to read said instructions and data from said memory and to run said computer program, said memory comprising a set of patterns, each pattern including a combination of one or more words and one or more part-of-speech tags, said set of patterns including at least:

Positive patterns which are associated with positive sentiment when taken out of context,
  Negative patterns which are associated with negative sentiment when taken out of context.
  Amplifier patterns which strengthen positive and negative sentiment of n entities to their right and left in a message,
  Attenuator patterns which weaken positive and negative sentiment of n entities to their right and left in a message,
  Right Flip patterns which flip positive and negative sentiment of n entities to their right in a message,
  Left Flip patterns which flip positive and negative sentiment of n entities to their left in a message,
  Continuator patterns which continue emission of positive and negative sentiment,
  Stop patterns which interrupt emission of positive and negative sentiment, wherein said processor is arranged to perform the following actions when running said program in order to detect polarity of a sentiment in a message:

Receiving said message m with a number of words,
  Representing said message as a list of tuples, each tuple comprising a word and an associated part-of-speech tag, each tuple having an initial sentiment emission value,
  Comparing all tuples of said list of tuples with said set of patterns and producing a set of matching patterns, each matching pattern comprising a start position in said message, an end position in said message and a pattern selected from said set of patterns that matches a tuple,
  Setting stops in said message, stops being defined as sentiment emission boundaries in said message, by setting a stop at a starting position of each left flip pattern and at the starting position of each stop pattern,
  Updating for each tuple its sentiment emission value based on positive patterns present in said message by applying a first decaying function on each sentiment emission value which first decaying function takes distance between each positive pattern and each tuple of said message into account, rendering a first updated set of sentiment emission values,
  Updating said first updated set of sentiment emission values based on negative patterns present in said message by applying a second decaying function on each sentiment emission value of said first updated set of sentiment emission values which second decaying function takes distance between each negative pattern and each tuple of said message into account, rendering a second updated set of sentiment emission values,
  Updating said second updated set of sentiment emission values based on amplifier patterns present in said message by applying an amplifying function on each sentiment emission value of said second updated set of sentiment emission values which amplifying function takes distance between each amplifier pattern and each tuple of said message into account, rendering a third updated set of sentiment emission values,
  Updating said third updated set of sentiment emission values based on attenuation patterns present in said message by applying an attenuation function on each sentiment emission value of said third updated set of sentiment emission values which attenuation function takes distance between each amplifier pattern and each tuple of said message into account, rendering a fourth updated set of sentiment emission values,
  Updating said fourth updated set of sentiment emission values based on right flip patterns present in said message by flipping each sentiment emission value of said fourth updated set of sentiment emission values of those tuples of said message that are within a certain distance to the right of said right flip patterns, rendering a fifth updated set of sentiment emission values,
  Updating said fifth updated set of sentiment emission values based on left flip patterns present in said message by flipping each sentiment emission value of said fifth updated set of sentiment emission values of those tuples of said message that are within a certain distance to the left of said left flip patterns, rendering a sixth updated set of sentiment emission values,
  Calculating a final polarity of said message by adding all sentiment emission values of said sixth updated set of sentiment emission values.

The invention also relates to a computer readable medium and a computer implemented method as defined in annexed independent claims.

Thus, the present invention provides an automatic sentiment analysis by a computer arrangement, a computer readable medium and a computer implemented method. A message is presented to the computer arrangement which stores a set of patterns. Each pattern has a word and an associated part-of-speech tag. The message is compared against the patterns as stored in memory rendering a set of matching patterns. The set of matching patterns is then processed in accordance with a set of rules taking into account presence of patterns in the message that may add to a positive polarity and negative polarity, and patterns that may amplify, attenuate or flip such positive polarity or negative polarity.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents. I.e., a person skilled in the art will understand that features, components, elements, etc. explicitly used to explain the invention can be substituted by technical equivalents unless otherwise stated.

The drawings show.

DETAILED DESCRIPTION OF EMBODIMENTS

1 Introduction

Figure 1:
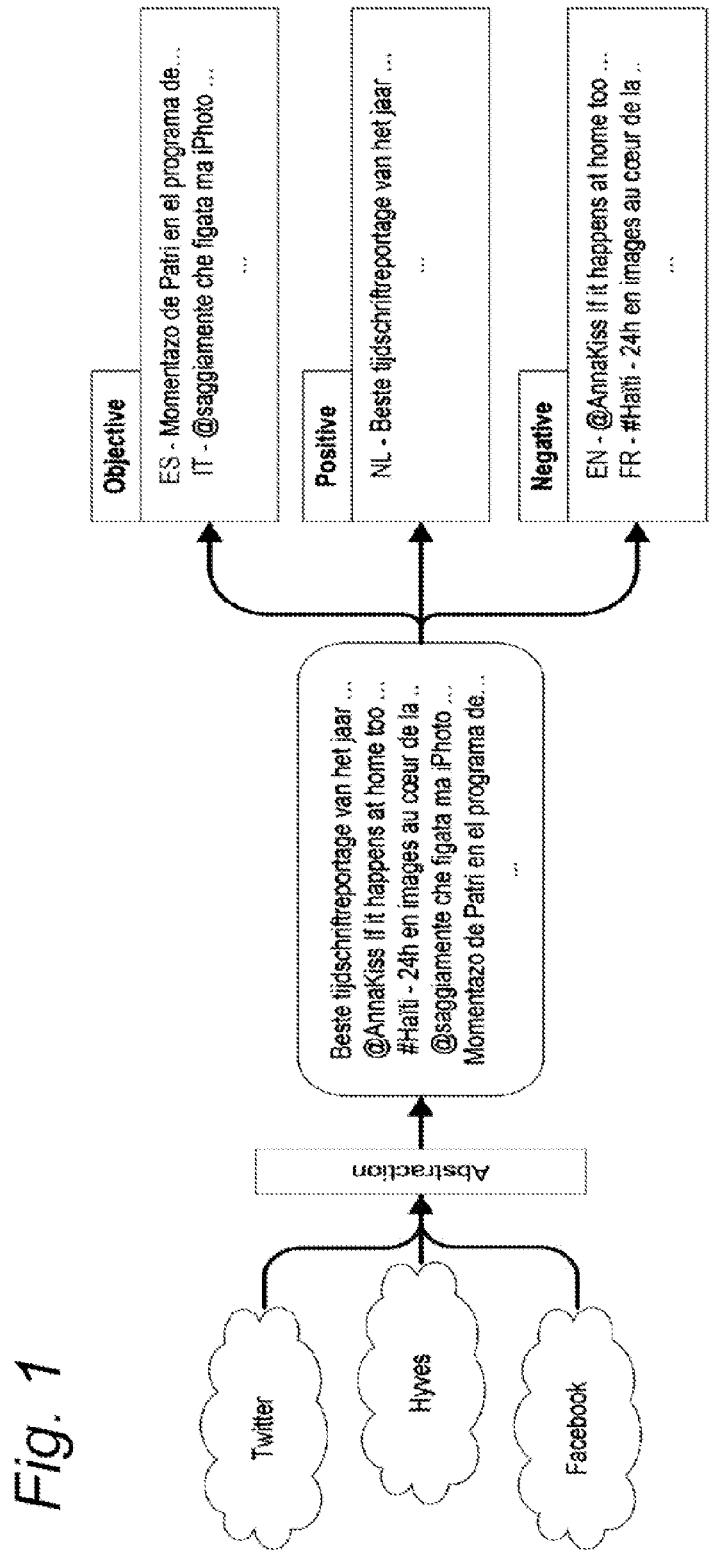
FIG. 1 conceptual idea of sentiment analysis

In this document, the problem of sentiment analysis is addressed. Sentiment analysis is the process of automatically determining sentiment expressed in natural language. The term sentiment is a broad one, varying from emotions to personal experiences. In this document we are concerned with a particular subset of sentiment, the "opinions". The problem we hence study is to determine the general opinion expressed in texts written in natural language.

In Section 1.1 we motivate why studying sentiment analysis is interesting. In Section 1.2 we more clearly state what sentiment analysis actually is by presenting a problem formulation which we subsequently use and answer throughout this document. The main results presented in this document are summarized in Section 1.3. The further outline of this document is presented in Section 1.4.

1.1 Motivation

Sentiment analysis is an increasingly active problem. Consumers use the web as an advisory body influencing their view on matters. Knowing what is said on the web allows to react upon negative sentiment and to monitor positive sentiment. Doing this by hand however is a tedious if not impossible task. With the growth of the web and especially social media, more and more attention is paid to the automated retrieval of sentiment from all kinds of sources.

Social media stimulate the information overload present on the web. Twitter[1] produced 50 million messages per day in 2010[2], an average of 600 tweets per second. The ease with which such a tweet can be placed stimulates the spread of people's opinions. This spectacular volume calls for an automated interpretation to flexibly and quickly respond to shifts in sentiment or rising trends.

[1] http://www.twitter.com/—A microblogging platform
[2] Numbers based on http://blog.twitter.com/2010/02/measuring-tweets.html As social media cover almost the entire world, the sentiment expressed by users of social media is written in a multitude of languages. The social media connect the entire world and thus people can much more easily influence each other. The presence of for example free online translation services makes the difference in language less important in this setting, which is a motivation for the need to cover multiple languages. Moreover, as more and more people share their opinion on social media, insights into sentiment can be obtained much quicker when performed automatically. This way one can almost directly respond on phenomena arising in society than traditionally.

A recent real-life example motivating the need for sentiment analysis is that of a Dutch comedian named Youp van't Hek and T-Mobile. Comedian van't Hek's son had a problem with his iPhone not working well with T-Mobile. The customer service did not help much via telephone after which van't Hek decided to post a Twitter message about his problem. Little attention was paid to this tweet which triggered more complaints by van't Hek and more importantly, his followers as they were influenced by van't Hek's sentiment, unleashing a burst of negative sentiment on T-Mobile. Research performed by Buzzcapture showed that the image damage to T-Mobile resulting from this burst of negative sentiment lies somewhere between 200.000 and 300.000 euros[3]. Through sentiment analysis, the burst of negative sentiment started by van't Hek could have been anticipated as shifts in sentiment could have been discovered through monitoring sentiment. Moreover, if this sentiment analysis is performed automatically, the anticipation can occur much more adequately, perhaps even avoiding bursts of negative sentiment in the first place by quickly responding when the amount of negative sentiment is still manageable.

[3] Numbers taken from http://buzzcapture-com.pressdoc.com/9051-youp-yan-t-hek-brengt-t-mobile-reputatieschade-toeyia-twitter—measured by analyzing the differences in sentiment and translating this to financial numbers 1.2 Problem Formulation Sentiment analysis can be performed at different levels of granularity with different levels of detail. We perform sentiment analysis on social media in which a single message typically consists of one or two sentences. Supported by this observation, the type of granularity we study is the sentence level. Other granularity levels can be the document level [Sindhwani and Melville, 2008, Pang and Lee, 2004], word level [Hatzivassiloglou and McKeown, 1997] or the phrase level [Riloff et al., 2003]. The level of detail typically goes into determining the polarity of a message, which is what we investigate as well. A more detailed approach could be to determine the emotion expressed [Potena and Diamantini, 2010] in addition to the polarity.

The problem we investigate thus takes a message m as input and produces a polarity indication p as output. The message m originated from one of the following social media: Twitter, Facebook[4], Hyves[5].

[4] http://www.facebook.com/—The world's largest social network
[5] http://www.hyves.nl/—Holland's largest social network The language of m is not known beforehand and we are interested in messages written in a closed set of multiple languages $l_1, \ldots, l_n$, rather than only regarding one language, for example English.

Conceptually, we can regard the problem of sentiment analysis as shown in FIG. 1 where we have a stream of unstructured texts originating from social media as input.

FIG. 1 shows the conceptual idea of sentiment analysis. The input is a stream of social media messages in different languages. The output is a crisp classification into objective, positive or negative along with the language of a message which is an additional requirement also allowing for more specialized approaches.

Though we use different social media, we regard all of our input as plain text. Determining the opinion of a message can be as extensive as regarding objective (not expressing any sentiment), positive (expressing positive sentiment), negative (expressing negative sentiment), neutral (expressing sentiment but neither positive nor negative) and bipolar (expressing both positive and negative sentiment) messages. We however assume that messages that are neutral are also objective. Moreover, as the messages placed on social media are very short, we also assume that only one polarity is prevailingly expressed in a message, we thus do not regard the bipolar class as we assume that a message containing two polarities always favors one of the two. Additionally, we associate the language a text is written in with each text, allowing for more fine-grained sentiment analysis by exploiting knowledge on the language a message is written in. Knowing the language of each message also allows for segmenting based on language. Though not our goal in this document, the results of such a sentiment analysis can be aggregated in different ways to obtain high-level statistics. Combining profiling information such as age or gender allows for a more fine-grained sentiment analysis on a segment-level.

Concisely stated, the answer to the problem we solve is a hard label being one of objective, positive or negative. The formulation of the problem itself is as follows: Given a message written in an unknown language to be determined, does this message contain sentiment and if so, what is the polarity of this sentiment?

1.3 Our Approach & Main Results

In one aspect of the invention, a four-step approach for automated sentiment analysis is used. For language identification we propose a new algorithm called LIGA. This algorithm uses a graph formalism to incorporate grammar into its model. For part of speech tagging (POS-tagging) we use existing work having publicly available models for different languages. For subjectivity detection we propose using AdaBoost ensemble learning with decision stumps as weak learners. Finally, we introduce a new algorithm called RBEM for polarity detection. This algorithm uses eight heuristic rules defined on patterns to determine the polarity of a text.

We extensively experimented with our four-step approach and each of its separate steps. We will show that our approach to each of the four steps outperforms other competitor approaches and baselines. We also show that each step aids to better solving the sentiment analysis problem by leaving each step out and comparing it against not leaving it out. For practical reasons one may want to use faster or simpler approaches at the cost of introducing higher error rates. We quantify the propagation of these errors along the four-step pipeline. This shows the effect of using approaches with lower accuracy with respect to the approaches we propose.

We created an alignment between the results of our four-step sentiment analysis results' against those of a traditional survey. We will show that the results of automated sentiment analysis are difficult to map onto the traditional survey's results. We identify problems inherently present with the mapping of the automated sentiment analysis on the traditional survey and propose alternatives to overcome these issues. We investigate making an alignment using natural language from social media against also using natural language for our traditional survey. We additionally investigate what it implies if we make a mapping when using a score-based rating to express sentiment for our traditional survey rather than using natural language. We created a framework implementing the theory presented in this document. This framework is outlined in Appendix A of [Tromp, Jul. 16, 2011] which is hereby incorporated by reference. Technical specifications of the software implementing the framework on which we base our analysis can be found in this Appendix A. This appendix comprises implementation specifications, database setup and configuration instructions. In addition to software, a traditional survey was created for use in our experiments. This survey is presented in its entirety in Appendix D of [Tromp, Jul. 16, 2011].

The software allows to automatically extract data from social media, thus providing input for the actual sentiment analysis process. It also allows for easy addition of insightful views that differ for each purpose. In our specific case, the sentiment analysis process consists exactly of the four steps we present in this document but any other process can be "plugged in" or components of our sentiment analysis process can be altered, removed or supplemented with other components.

Sentiment analysis is a problem that can be applied in many areas. Five possible application areas where our four-step approach can be used to support daily business, specifically in the case of using it to support in answering marketing questions, are presented in Appendix C of [Tromp, Jul. 16, 2011] the content of which hereby being incorporated by reference. Five settings as example applications of sentiment analysis are demonstrated. The strengths and weaknesses of using sentiment analysis over traditional surveys in each use case are discussed.

Outline

In Section 2 we introduce our four-step approach to the sentiment analysis problem and refer to related work. This four-step approach entails language identification (LI), part-of-speech (POS) tagging, subjectivity detection and polarity detection. For language identification we present an algorithm called LIGA (Language Identification through a Graph based Approach) in Section 2.1.3. For POS-tagging we use Stuttgart's TreeTagger which we briefly describe in Section 2.2. Subjectivity detection we approach using AdaBoost, which we describe in Section 2.3. We conclude our approach by describing polarity detection in Section 2.4. For polarity detection we introduce an algorithm called RBEM (Rule-Based Emission Model) in Section 2.4.2.

We extensively experimented with our four-step approach. Some notes are made in Section 3.

We conclude by presenting the main results and achievements in Section 4.

2 Four-Step Approach for Sentiment Analysis

Figure 2:
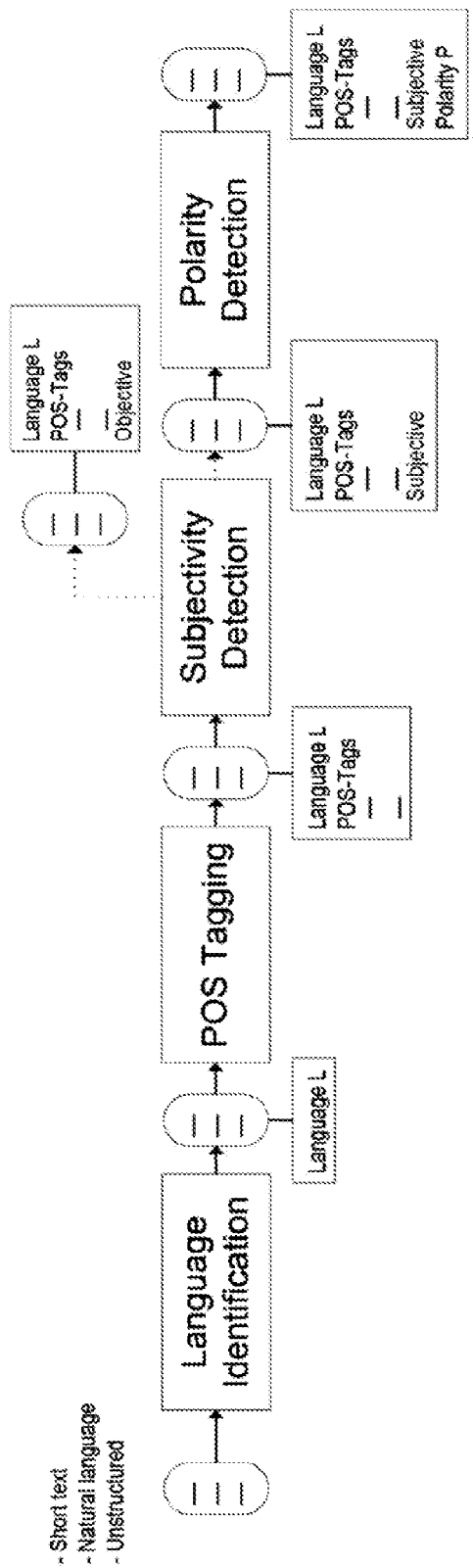
FIG. 2 four-step approach for sentiment analysis

The approach we take to solve the sentiment analysis problem consists of four steps; language identification, part-of-speech tagging, subjectivity detection and polarity detection, as shown in FIG. 2 which shows the four-step approach for sentiment analysis. The input consists of unstructured texts. First, language identification determines the language after which POS-tagging enriches the text with additional features (POS-tags). The subjectivity detection determines if the text contains subjective aspects. If not, the text is objective, otherwise the text's polarity is determined by the polarity detection. This is explained in more detail below.

Information is retrieved from social media. As this information differs in format we use an abstraction layer such that all input looks the same to our sentiment analysis process.

This sentiment analysis process in turn takes as input an unstructured, short text of which no prior knowledge is known, not even the social medium from which it originates. At each step more information is added and as output we either get a polarity or that the text is objective. This implies that only subjective texts are processed by the polarity detection step as objective texts do not have any polarity. The rationale behind using four steps is that we can more specifically construct models in a later step when knowledge from earlier steps is present. The separation of subjectivity and polarity detection is inspired by [Pang and Lee, 2004]. The use of each step is experimentally investigated in Section 3. Each step tackles a sub-problem on its own and we describe each problem separately and present our solution to it.

The approaches we next present are implemented in an extendable framework discussed in more detail in Appendix A of [Tromp, Jul. 16, 2011]. This framework allows to crawl and scrape social media for data that can serve as input for the sentiment analysis process. The sentiment analysis itself in our setting consists of the four steps we next describe but due to the nature of the framework, more steps can be added without jeopardizing the other steps. For example, an emotion classifier—a more elaborate case of sentiment analysis where the emotion of a message is automatically extracted—can be added as an additional step. Alternatively, steps can be removed or supplemented and even a completely different (sentiment analysis) process can be used instead of what we use without having to reconstruct the data collection.

Each of the separate steps of our framework can also be extended, modified or replaced to suit different purposes. As the input of one step is the output of another step, there is no dependency between the actual operational properties of the steps but only on the input and the output. This means that any step can be replaced or extended in any way as long as the input and output remain the same. As an example, it is possible to replace our approach for subjectivity detection with a Naive Bayes algorithm also performing a two-way classification into subjective or objective.

2.1 Language Identification

Language identification is the first step in our process. Knowing the language gives us the opportunity to apply more specific models in succeeding steps. Additionally, we can filter out those languages which we are not interested in. We first formulate the problem of language identification in Section 2.1.1 after which we describe related work in Section 2.1.2 and present our approach in Section 2.1.3.

2.1.1 Problem Formulation

Language identification is a supervised learning task. Given some historical or training data in which for each text t we know a label l, the language in which this text is written, our goal is to learn a model such that given some previously unseen text we can say as accurately as possible in which language this text is written.

In our study, we do not consider cases when for a text written partly in one language and partly in some other language someone would like to get both labels as an output. We also do not consider language groups or any other dependencies between the language labels, thus yielding a more specific case of the generic language identification problem.

2.1.2 Related Work

The N-gram-based approach for language identification [Cavnar and Trenkle, 1994] chops texts up in equally-sized character strings, N-grams, of length n. It is assumed that every language uses certain N-grams more frequently than other languages, thus providing a clue on the language the text is in. Experimental studies in [Cavnar and Trenkle, 1994] suggest that using trigrams (at the character level) generally outperform using other sized N-grams.

The idea behind the N-gram-based approach is borrowed from [Dunning, 1994] where using Markov models for language identification was considered. This approach however lacks the intuition the N-gram approach has and requires more time for training a model and for classifying a new text.

A simple, straightforward approach is to use word frequencies. One variant is to use short words [Prager, 1999] as they occur regularly in a language and usually differ per language. Another variant is to use the most frequently occurring words [Martino and Paulsen, 1996, Cowie et al., 1999] for the same rationale.

A compression-based approach for language identification was proposed in [Harper and Teahan, 2001]. Labeled data is compressed using a so-called prediction by partial matching (PPM) approach to construct language models. An unlabeled text is also compressed and the number of bits required to encode this new document is compared to the of number bits used in the language models. The likeliness of a text belonging to a language model is computed using entropy as a similarity measurement.

2.1.3 Our Approach

In general, in the four steps of our approach the above described method, or other suitable language identification method can be used. However, another, preferred, method was developed in the context of this investigation. We give a compact description of our approach for language identification. For a more elaborate description we refer to [Tromp and Pechenizkiy, 2011]. This approach entails an algorithm using a graph formalism and N-grams that specifically targets identifying the language of messages present on social media. Given the problem formulation presented in Section 1.2, restated below with a bold font on the part answered by language identification concerning the determination of the language.

Given a message written in an unknown language to be determined, does this message contain sentiment and if so, what is the polarity of this sentiment?

In our approach we want to utilize not only word presence and occurrences but also their ordering.

To capture the ordering of words, we create a graph model on labeled data. The labels of its vertices represent the presence of words in a given language. The weights of the vertices represent the frequencies of words in a given language. The crucial part is in the presence and weights of the edges, which try to capture the grammar of a language.

In this particular case we only capture the ordering as a grammatical aspect. We use character N-grams in our approach. We will thus not truly capture word information but N-gram information. Next, we give the preliminaries, the methodology to learn LIGA and to classify unlabeled texts. We additionally provide a methodology to filter out messages written in languages not present in our model.

Preliminaries

We extend a basic graph $G=(V, S)$ with a labeling function $\mathcal{L}: V \to S$. This labeling function assigns to each vertex $v \in V$ a label $l \in L$ uniquely identifying the vertex. Let Lang denote all languages present in our training set, then the function $\mathcal{W}_v: V \times \text{Lang} \to \mathbb{N}$ assigns for each vertex $v \in V$ and every language $l \in \text{Lang}$ a weight. For edges we have a similar function $\mathcal{W}_e: E \times \text{Lang} \to \mathbb{N}$. Since we will incrementally construct our graph, we may encounter that, for a label l of a vertex u to be added, $\exists_{v \in V}: v \neq u \wedge \mathcal{L}(v)=i$. We then say that $\mathcal{L}(v)$ is defined. We say $\mathcal{L}(vi$ is undefined in all other cases. We use the same notion of defined for $\mathcal{W}_v$ and $\mathcal{W}_e$. Using the mentioned extensions, we represent a graph as the following quintuple.

$$G=(V,E,\mathcal{L},\mathcal{W}_v,\mathcal{W}_e) \quad (1)$$

A labeled text t of which the language l is known is denoted as the binary tuple (t,l). An unlabeled text s will be denoted as the binary tuple (s,λ). We denote all N-grams of a text t as the ordered list $N_{n_t}=[g_1, g_2, \ldots, g_k]$ where n denotes the length of the N-grams. The order in $N_{n_t}$ respects the order in which the N-grams occur in (t, l) or (s, λ).

Learning a Model

Our goal is given a training set $\mathcal{T}$ consisting of labeled texts for every language in Lang to learn a model consisting of a single graph G.

For each text $(t, l) \in \mathcal{T}$ we construct the list $N_{n_t}$. For every $m \in N_{n_t}$ we create a vertex v with $\mathcal{L}(v)=m$, but only if $\mathcal{L}(v)$ is undefined. For every $e \in \{(u,t) \in V \times V : (\mathcal{L}(u)=m_i \wedge \mathcal{L}(v)=m_{i+1}) \Rightarrow (m_i, m_{i+1} \in N_{n_t})\}$ we create an edge e, but only if $e \in L$. The weights are updated as follows:

$$\mathcal{W}_v(v, l) = \begin{cases} \mathcal{W}_v(v, l) + 1 & \text{if } \mathcal{L}(v) \text{ is defined} \\ 1 & \text{otherwise} \end{cases} \quad (2)$$

$$\mathcal{W}_e(e, l) = \begin{cases} \mathcal{W}_e(e, l) + 1 & \text{if } \mathcal{W}_e(e, l) \text{ is defined} \\ 1 & \text{otherwise} \end{cases}$$

When we add a node or edge (i.e. when $\mathcal{L}(v)$ or $\mathcal{W}_e(e, l)$ is undefined respectively), we initialize the weights of all languages for that vertex or node to 0 before applying the weight updates. When applying the aforementioned definitions for all $(t,l) \in \mathcal{T}$ we get our graph $G=(V, E, \mathcal{L}, \mathcal{W}_v, \mathcal{W}_e)$. We illustrate this by an example. Consider the following two texts of which the first is in Dutch (NL) and the second is in English (EN).

Example 1

$(t_1, NL)$=is dit een test
$(t_2, EN)$=is this a test

We then first create the ordered lists of N-grams. When using trigrams ($n=3$) we get the following, where a space is denoted by a dot •.

$$N_{3_{t_1}} = [IS\cdot, S\cdot D, \cdot DI, DIT, IT\cdot, \quad (3)$$

$$T\cdot E, \cdot EE, EEN, EN\cdot, N\cdot T, \cdot TE, TES, EST]$$

$$N_{3_{t_2}} = [IS\cdot, S\cdot T, \cdot TH, THI, HIS, IS\cdot,$$

$$S\cdot A, \cdot A\cdot, A\cdot T, \cdot TE, TES, EST]$$

We next start constructing the graph. For each $$n \in N_{3_{t_1}} \cap N_{3_{t_2}}$$

we add a vertex v to our graph, having $\mathcal{L}(v)=n$. For example, for the first element in $$N_{3_{t_1}}$$

we will create the vertex having v $\mathcal{L}(v)=is\cdot$. For the first element in $$N_{3_{t_2}}$$

we will not add a new vertex as $\mathcal{L}(v)$ is defined. In our example, for vertex v (having $\mathcal{L}(v)=is\cdot$) we will have $\mathcal{W}_v(v, NL)=1$ and $\mathcal{W}_v(v, EN)=1$ as is• occurs once in both the Dutch as well as the English text.

We next add edges. We will have edges from for example v to u(g=(v,u)) where $\mathcal{L}(v)=is\cdot$, and $\mathcal{L}(u)=s\cdot d$, capturing the order between the first and second elements of $N_{n_1}$. Since this connection occurs only once, and only for the Dutch text, we have that $\mathcal{W}_e(g, NL)=1$ and $\mathcal{W}_e(g, EN)=0$.

Figure 3:
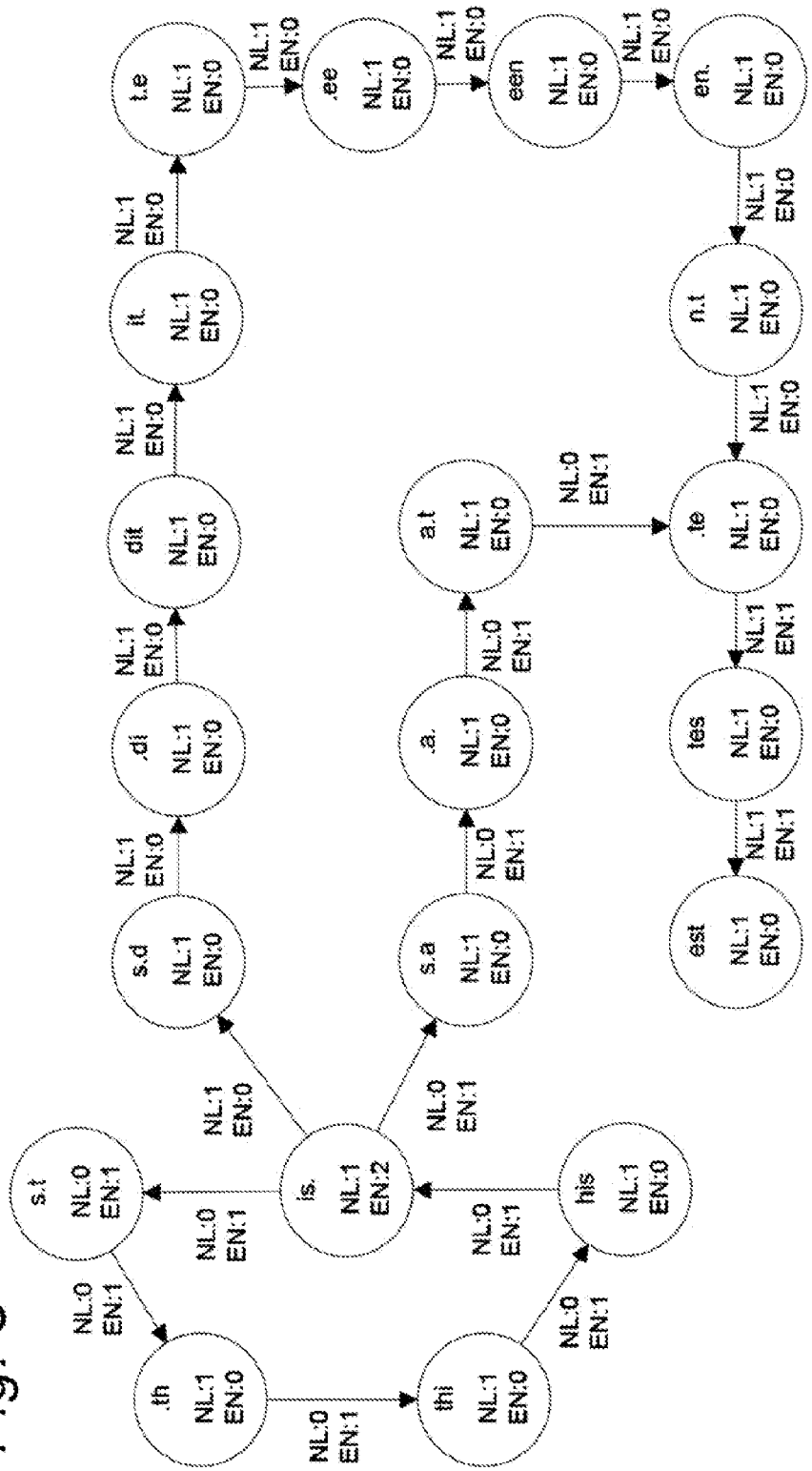
FIG. 3 graph resulting from the labeled example 1 for language identification.

FIG. 3 shows the graph resulting from this example. Each N-gram is a vertex of which the weights for each language are given inside it. The ordering of N-grams is captured by the weighted edges between them. The labels of the vertices are shown at the topmost position inside the vertices. The weights per language are listed with the vertices and edges.

Classifying a Text

Once we have constructed G, we can use it to classify unlabeled texts. To do so, we first need to transform an unlabeled text into something similar to G such that we can compare the two.

Figure 4:
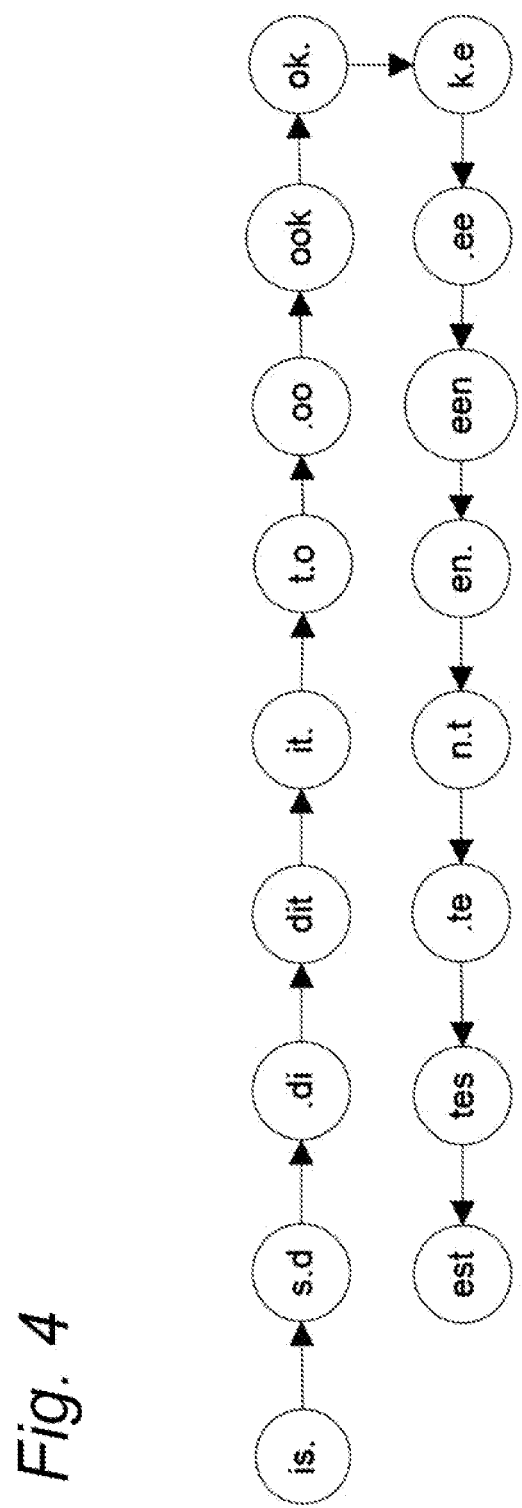
FIG. 4 path resulting from the unlabeled example for language identification

While for constructing G we use weights to indicate multiple occurrences of a given N-gram, for the unlabeled text we create multiple vertices—one for every occurrence. We thus in fact get a simple graph, a path $g=(V, E, \mathcal{L}, v_{start})$. Here $|y|=|N_{n_t}|$ and if $N_{n_t}=[n_1,n_2, \ldots, n_k]$ then $g=\{(u,v)\mathcal{L}(u)=n_i \wedge \mathcal{L}(v)=n_{i+1}\}$. The node $v_{start} \in V$ is the starting node of our path. We again have our labeling function $\mathcal{L}:V \rightarrow L$. To illustrate this, we consider the following (Dutch) text is dit ook een test of which we would not know the label in advance. The path π for this example is shown in FIG. 4.

A crucial step is to compare π and G. We compute the so-called path-matching scores for each language $l \in$ Lang. Conceptually, this is done by 'laying' the path over the graph and measuring its similarity for each language. Since all languages we have knowledge of are present in a single model, we can compute the scores for all languages in one go.

To keep track of the matching scores of our languages, we maintain a scoring function $\mathcal{PM}$ :Lang→$\mathbb{R}$ assigning a rational number to every language $l \in$ Lang. Initially, we say that $\mathcal{PM}(l)=C$ for all $l \in$ Lang. Let $G=(V, E, \mathcal{L}, \mathcal{W}_v, \mathcal{W}_e)$ be the graph representing our model and $\pi=(V', E', \mathcal{L}', v_{start})$ be our labeled path. In order to keep our method robust with respect to differing quantities of labeled data for different languages, we will normalize the scores. Let $\Sigma_v = \Sigma_{v \in V} (\Sigma_{l \in Lang}(\mathcal{W}_v(v, l))$ be the total sum of all weights contained in all nodes in G. Also, let $\Sigma_e = \Sigma_{e \in E}(\Sigma_{l \in Lang}(\mathcal{W}_e(e,l)))$ be the sum of all weights contained in all edges in G. We then start traversing our path π in G starting with node $v_{start}$. Let $v'_i$ denote the node we are currently visiting (initially, $v'_i = v_{start}$). We try to find a $v \in V$ such that $\mathcal{L}(v) = \mathcal{L}'(v'_i)$. Note that there is at most one such node but there may be none. We update the matching scores according to (4). In this step we account for the occurrence of a given N-gram from π in G $$\forall_{l \in Lang}: \mathcal{PM}(l) = \begin{cases} \mathcal{PM}(l) + \dfrac{W_v(v, l)}{\Sigma_t} & \text{if } \exists_{v \in V} : \mathcal{L}(v) = \mathcal{L}'(v'_i) \\ \mathcal{PM}(l) & \text{otherwise} \end{cases} \quad (4)$$

The next step is to account for the order, which is only performed if we were able to find a $v \in V$ such that $\mathcal{L}(v) = \mathcal{L}'(v'_i)$. We find the only edge $g' \in E'$ that has our previous node $v'_i$ as source, if any (since the last node has no outgoing edges). We thus find the edge $g'=(v'_i, v'_{i+1})$. We then update the matching scores according to (5).

$$\forall_{l \in Lang} : \mathcal{PM}(l) = \qquad (5)$$

$$\begin{cases} \mathcal{PM}(l) + \dfrac{W_e(e, l)}{\sum\limits_e} & \text{if } \exists_{e \in E} : \begin{pmatrix} \exists\, v, w \in V: \mathcal{L}(v) = \mathcal{L}'(v'_i) \wedge \\ \mathcal{L}(w) = \mathcal{L}'(v'_{i+1}) \wedge e = (v, w) \end{pmatrix} \\ \mathcal{PM}(l) & \text{otherwise} \end{cases}$$

We have now accounted for the order between two N-grams present in our path whose label is given in nodes $v'_i$ and $v'_{i+1}$. We next continue traversing our path by performing (1) again for $v'_{i-1}$ after which we can apply (2). This process continues until we find a node $v'_{end} \in V'$ such that $(\exists_{v' \in V'}: (v'_{end}, v')$; this is the ending node not having any outgoing edges.

When we have matched the entire path onto the graph, we need our function $\mathcal{PM}$ to determine the language. For each language, $\mathcal{PM}$ maps it onto a value in $\mathbb{R}$. More specifically, since the weights of the nodes accounted to $\mathcal{PM}$ are normalized and so are the weights of the edges, we end up with a score in [0, 2] (when our model is isomorphic to our path for a given language, we get a score of 1 for the nodes and 1 for the edges). We now say that the text of which we were identifying the language is in language $l = \mathrm{argmax}_{l \in lang}: \mathcal{PM}$ (1).

Filtering Out Unknown Languages

As in our setting we are only interested in a subset of all languages used on social media, we want to filter out those messages that we are not interested in. For example, our succeeding steps may only have models for languages Lang=$l_1, \ldots, l_n$, any language $l' \notin$ Lang can not be processed by succeeding steps and hence needs to be filtered out. To filter out such messages written in languages not present in our model, we add an additional threshold. Consider the case where we have a model containing information on languages L=$\{l_1, \ldots, l_n\}$. If we now encounter a message m whose actual language is r, having $r \notin$ Lang, we still assign scores for each language $l_1 \in$ Lang. As the algorithm then dictates, the language with the highest score is the resulting class but since $r \in$ Lang this can never be the right class. We therefore need such a threshold.

The threshold is defined as dividing the resulting score by the message's length in characters. For our experiments, we use a threshold of 0.00125 which showed the most promising results during a small manual inspection of a simple experiment using different thresholds. Whenever no language obtains a score higher than this threshold, we label the message's language to be UNKNOWN and disregard it. Note that the threshold we use stems from a very small-scaled experiment and hence more extensive experiments will show more promising thresholds. For our purposes however, this threshold shows sufficient performance in the small-scaled experiment in which we compared different thresholds.

2.2 Part-of-Speech Tagging

Part of speech tagging is the second step in our approach. We use this step merely to expand our feature space. Related work [Pang et al., 2002, Pang and Lee, 2008] shows that using just word tokens for subjectivity or polarity detection—the succeeding steps in which the expanded feature space can be used—yields similar or better results than using POS-tags with for example Bayesian and SVM approaches. As such, the accuracy of this step is expected not to be as crucial as that of other steps since we can choose using tokens instead of POS-tags. Nevertheless, a higher accuracy is more beneficial. Both subjectivity detection as well as polarity detection make use of the POS-tags of a message.

We first describe the part-of-speech tagging problem more formally in Section 2.2.1. We then point to related work in Section 2.2.2 after which we describe the approach we take to solving part-of-speech tagging in Section 2.2.3.

2.2.1 Problem Formulation

Part-of-speech tagging is the process of assigning a grammatical group to a word. A model is trained on tagged data where for each word of a sentence, its POS-tag is known. Words are hence in context and one single word may have different POS-tags depending on the context. The task at hand is to assign POS-tags $[t_1, \ldots, t_n]$ to each of the words $w_i \in W$ of a previously unseen sentence W containing just words.

POS-tags differ per language. We thus require to know the language in advance before applying POS-tagging. When we apply POS-tagging, we use different models for each language, thus supporting the different POS-tags used in each language.

2.2.2 Related Work

Different approaches to POS-tagging have been proposed. An elegant and simple approach is the Brill Tagger proposed in [Brill, 1992]. This tagger uses rules selected from a predefined set that define what POS-tag is assigned to what word. The tagger iteratively evaluates the attribution of each rule to the accuracy and uses only those rules that score best.

More prevailing in POS-tagging are stochastic approaches. Fully Bayesian approaches have been proposed [Goldwater and Griffiths, 2007] but hidden Markov models (HMMs) and its extension; conditional random fields (CRFs) are more commonly used [Cutting et al., 1992, Kupiec, 1992, Lafferty et al., 2001]. These stochastic approaches are typically supervised but there is also work on unsupervised and even semi-supervised approaches.

2.2.3 Our Approach

We solve POS-tagging by using Schmid's TreeTagger developed at the University of Stuttgart and introduced in [Schmid, 1994]. Markov model approaches to solving POS-tagging typically use potentially sparse data to estimate transition probabilities. Due to the sparsity of the data, these probability estimates may be relatively unreliable. The TreeTagger remedies this issue by not only estimating word probabilities but also incorporate a suffix model.

Instead of using Markov models, the TreeTagger uses decision trees where the leafs contain probability estimates of a tag occurring given x previous tags. In his work, [Schmid, 1994] uses trigrams and hence only considers the previous two tags, resembling a second order Markov model. To create the decision tree, a modified version of the ID3-algorithm [Quinland, 1983] is used where information gain is used as splitting criterion.

The strength of the TreeTagger however lies not within just exploiting decision trees where traditionally Markov models are used. In addition to just using (word) N-grams and their probability estimators, [Schmid, 1994] also uses a suffix tree. Such a suffix tree acts similar to the regular N-gram tree but only relevant suffixes up to a given length ([Schmid, 1994] uses a length of three) are used. If no match can be made against the N-gram tree, the suffix tree is used. Within this tree, first the last character of the respective word is looked up. Next its last-but-one character is looked up and finally its last-but-two character is looked up, in the case of a suffix tree of length three. It may occur that even a match against the suffix tree is not possible. In such a case, a default a priori POS-tag is used, defined by the prevailingly occurring tag for a word.

POS-tags and their acronyms used here may be derived from the "PENN-Treebank". An overview is given at the end of the present document.

In our example presented in Section 2.1.3, we had the Dutch text is dit ook een test, the English equivalent is this also a test. A possible output of the POS-tagger is shown in Example 2.

Example 2

THE POS-TAGS FOR THE MESSAGE is this also a test.

| WORD | TAG | |
|------|-----|---|
| IS | VBZ | (VERB) |
| THIS | DT | (DETERMINER) |
| ALSO | RB | (ADVERB) |
| A | DT | (DETERMINER) |
| TEST | NN | (NOUN) |

The rationale behind using this tagger is that it contains publicly available models in numerous languages. The TreeTagger can output multiple tags with varying probabilities for a single word. We only use the most probable tag and disregard the others. The POS-tags will not answer any part of the problem formulation given in Section 1.2 but rather serve as additional information for succeeding steps.

2.3 Subjectivity Detection

Subjectivity detection is our third step. Once we know the language of a message and have determined its POS-tags, we identify whether a message expresses private state or not. If this is not the case, a message is said to be objective which is one of our labels and hence the message is not processed further. If a message does contain private state, it is said to be subjective and we pass such a message on to polarity detection to determine the polarity expressed.

The problem formulation is more concretely defined in Section 2.3.1. We refer to related work not only on subjectivity detection but also on polarity detection in Section 2.3.2 as these two processes are often combined into one. We present our approach on subjectivity detection in Section 2.3.3.

2.3.1 Problem Formulation

The goal of subjectivity detection is to determine whether a given message is subjective or objective. By subjective we mean a message containing any form of private state; a general term covering opinions, beliefs, thoughts, feelings, emotions, goals, evaluations and judgments [Quirk et al., 1985]. More formally, subjectivity detection is a supervised learning task taking a message m as input, providing a label s∈{Subjective, Objective} as output. The message m can consist of just its words (tokens), just its POS-tags or both. Note that when a message is objective, it is not processed by the polarity detection step. If a message is subjective, the polarity detection step next identifies its polarity. Since we know the language a message is in through our earlier language identification step, we can apply language-specific models.

2.3.2 Related Work

Subjectivity detection is often combined with polarity detection, either as two separate steps or as one big step. We therefore refer to work on either subjectivity or polarity detection (or both).

One of the earliest works in this area is that of [Hatzivassiloglou and McKeown, 1997] who deduce polarity of adjectives using different conjunctive words. More elaborate work was done by [Pang et al., 2002] who compare numerous machine learning techniques for opinion mining. They continue their work in [Pang and Lee, 2004] and [Pang and Lee, 2008].

Other works are those of [Riloff et al., 2003, Wilson et al., 2005, Wiebe et al., 2005, Wiebe and Micalcea, 2006]. In these related works, the authors start from bootstrapping methods to label subjective patterns. In their latest work, both subjectivity and polarity detection is performed and evaluated using these patterns along with high precision rules defined in their earlier works.

More recently attention is being paid to sentiment analysis on social media. Sentiment analysis on Twitter is researched by [Go et al., 2009, Pak and Paroubek, 2010] who use similar methodologies to construct corpora and analyze Twitter messages to determine their polarity. [O'Connor et al., 2010] use opinion mining on Twitter to poll the presidential election of the United States in 2008 and show how using Twitter opinion time series can be used to predict future sentiment.

2.3.3 Our Approach

Although the above methods can be used, we prefer another method. The approach we take to solving subjectivity detection is inspired by the text categorization methodology BoosTexter [Schapire and Singer, 2000]. BoosTexter uses boosting to categorize texts. For our subjectivity detection we do not use BoosTexter but do use the boosting principle by means of the simpler AdaBoost, first introduced in [Freund and Schapire, 1995].

AdaBoost uses an ensemble of weak learners to create a strong learner. It does this on a per-round base where each round, those entries that were misclassified get more attention next round by increasing the weight of these entries. This process continues until either the maximum number of rounds is reached or the weighted error is more than 50%.

The weak learners we use are decision stumps, decision trees of length 1. These stumps can be seen as rules of the form if $f$ present then label=a else label=b where $f$ is a (binary) feature and a and b are possible labels. In our case we only regard presence of features and consider a biclass classification problem. The model-weighting function we use (see [Freund and Schapire, 1995]) is $$a_t = \frac{1}{2}\ln\frac{1-E_t}{E_t}$$

where $E_t$ is the classification error at iteration t.

Supported by experimental results, we use 50 weak learners and POS-tags combined with a prior polarity lexicon for features. The prior polarity lexicons contain positive, negative and negation words. In addition to the presence of POS-tags we have one additional feature indicating the presence of exactly one positive word (weak positiveness) and one feature indicating the presence of multiple positive words (strong positiveness). We also have two identical features for the negative case. Whenever a positive or negative word is directly preceded by a word from the negation list, its polarity is flipped.

Taking our problem formulation posed in Section 1.2 into account, which is restated below, we solve the bold part of determining whether sentiment is contained with in the message or not.

Given a message written in an unknown language to be determined, does this message contain sentiment and if so, what is the polarity of this sentiment?

2.4 Polarity Detection

The last step of our process is polarity detection. In our setting, this step only takes subjective messages as input. It then determines whether the message contains positive or negative subjective statements. We first define this problem more crisply in Section 2.4.1. Related work is already referred to in Section 2.3.2. We present our RBEM algorithm to solve polarity detection in Section 2.4.2.

2.4.1 Problem Formulation

Polarity detection is a task that determines the polarity a message expresses. This can be a general case where the polarity can be one of positive, negative, bipolar, neutral where 'neutral' generally, but not necessarily, implies objectiveness. Consider for example the sentence I think I just saw a car pass by which expresses a personal view but has no polarity. For our purposes, we regard a somewhat simpler problem by assuming that the neutral class always implies objectiveness. As subjectivity detection filters our objective messages from the succeeding process already, we need to assign to a given message m whether it is positive, negative or bipolar but we assume that either positive or negative sentiment always prevails when both occur. We thus only do this if a message actually does express a polarity, meaning that we only process messages labeled subjective by the subjectivity detection step. We approach this problem in a supervised manner where we use different models for different languages.

Taken our assumptions into account, the problem we solve is the following. Given n labeled messages $[m_1, \ldots, m_n]$ of which the label can either be positive or negative, learn a model such that for an unlabeled subjective message t, we can determine whether it is positive or negative.

2.4.2 Our Approach

When we look at our problem formulation posed in Section 1.2, restated below, polarity detection solves the bold part concerning what the polarity is of the sentiment that is expressed.

Given a message written in an unknown language to be determined, does this message contain sentiment and if so, what is the polarity of this sentiment?

To solve this problem of polarity detection, we propose an algorithm we call the Rule-Based Emission Model (RBEM) algorithm. The name of the algorithm indicates the concepts it carries as it uses rules to define an emissive model. Each entity in a message can emit positive or negative sentiment. The rules are defined on eight different types of patterns. The idea of using patterns arises from [Wilson et al., 2005] who label subjective expressions (patterns) in their training data. In their experiments however they limit themselves to matching against single-word expressions. The use of rules stems from a different domain. The Brill tagger [Brill, 1992] for POS-tagging uses rules. We borrow this ideology and apply it to polarity detection. The emission aspect of our RBEM algorithm is related to smoothing which is often applied in different machine learning settings for different purposes.

The rules used in the RBEM algorithm directly stem from eight different pattern groups, defined as follows. Note that the examples only list words but that a pattern can consist of any combination of words and POS-tags. This concept is further explained when we describe how to learn a model.

Positive patterns are positive when taken out of context. English examples hereof are good, well done. We denote this group as positive.

Negative patterns are negative when taken out of context. English examples hereof are bad, terrible. We denote this group as negative.

Amplifier patterns strengthen polarity, either positive or negative. English examples hereof are very much, a lot. We denote this group as amplifier.

Attenuator patterns weaken polarity, either positive or negative. English examples hereof are a little, a tiny bit. We denote this group as attenuator.

Right Flip patterns flip the polarity of n entities to their right. English examples hereof are not, no. We denote this group as rightflip.

Left Flip patterns flip the polarity of n entities to their left. English examples hereof are but, however. We denote this group as leftflip.

Continuator patterns continue the emission of polarity. English examples hereof are and, and also. We denote this group as continuator.

Stop patterns interrupt the emission of polarity. Stop patterns usually are punctuation signs such as a dot or an exclamation mark, expressing the general case that polarity does not cross sentence boundaries. We denote this group as stop.

The need for continuators and left flips has been indicated in earlier work by [Hatzivassiloglou and McKeown, 1997] who found that conjunctive words such as and usually connect adjectives of the same polarity whereas conjunctive words such as but usually connect words of opposing polarity. The need for positive and negative patterns is trivial. The remaining patterns stem from our own experience. Combining these eight pattern groups using some simple rules allows us to define an emissive model. We next describe how a model is constructed and then define how to classify previously unseen data. Definitions are presented when we first introduce them.

Learning a Model

Each message m of length n is represented as a list $m=[(w_1, t_1), \ldots, (w_n, t_n)]$ of tuples words $w_i$ with their respective POS-tags $t_i$. Note that we will use the terms element, entity and tuple interchangeably for an element $(w_i, t_i)$ of our message $h=[(w_1, t_1), \ldots, (w_n, t_n)]$. Upon such a message, patterns can be defined. A pattern is a list of tuples of words and POS-tags and is represented in the same fashion messages are. A pattern belongs to a single pattern group and hence we represent a pattern q as a tuple $q=(g, p)$ where g is the pattern group q belongs to and p is the list of tuples comprising the actual pattern. In general, each element $(w'_i, t'_i)$ of a pattern p consists of a word $w'_i$ which is precisely defined and a POS-tag $t'_i$, which is also precisely defined. As an exception, elements of p may contain wildcards instead. We consider three types of wildcards.

Word wildcards—In this case we only consider POS-tags $t'_i$. Word $w'_i$ can be any arbitrary word. This type of wildcards can occur at any position in p. Such a tuple is represented as $(\_, t'_i)$.

Single-position wildcards—In this case a single entity can be any arbitrary combination of a single word and a single POS-tag. This type of wildcards can occur at any position in p. Such a tuple is represented as $(\_, \_)$.

Multi-position wildcards—In this case any arbitrary combination of word and POS-tag pairs of any arbitrary length matches the pattern. This type of wildcards can only occur in between two elements that are not multi-position wildcards nor single-position wildcards as co-occurrence with either of these two wildcards yields another multi-position wildcard. Such a tuple is represented as $(*, *)$.

Our model now simply consists of a set of patterns per pattern group, represented as the set Model containing tuples of groups and patterns (g, p). Every pattern except for the positive and negative patterns adhere to an action radius $\in$. This action radius is also part of our model. In this work, we set $\in=4$. The action radius defines the length of the window within which tuples of all pattern groups except for the positive and negative group can influence the polarity emission of other tuples. The choice is not arbitrary but again inspired by the work of [Wilson et al., 2005] who mention using local negation with a frame of four words yielded the best results among other frame lengths.

Classification

When classifying previously unseen data, we perform two steps. First we collect all patterns in our model that match our sentence. Second, we apply a rule associated with each pattern group for each pattern present in our message. We first describe how patterns present in our model are matched against our message and next describe the rules applied to these patterns.

Pattern Matching

Each pattern $g=(q, p) \in$ Model is matched against our message $h=[(w_1, t_1), \ldots, (w_n, t_n)]$ where $p=[(v_1, s_1), \ldots, (v_m, s_m)]$ is our pattern. We consider each tuple $(w_i, t_i)$ and evaluate $(v_1, s_1) =_{match} (w_i, t_i)$ where $=_{match}$ is defined as follows.

$$(v_j, s_j) =_{match}(w_i, t_i) \equiv$$

$$\begin{cases}
\text{true} & (6) \\
\quad \text{if } j > m, \text{ define end} \leftarrow i \\
\text{false} & (7) \\
\quad \text{if } i > n \\
v_j = w_i \wedge s_j = t_i \wedge (v_{j+1}, s_{j+1}) =_{match}(w_{i+1}, t_{i+1}) & (8) \\
\quad \text{if } v_i \neq \_ \wedge v_i \neq * \wedge j \leq m \wedge j \leq n \\
s_j = t_i \wedge (v_{j+1}, s_{j+1}) =_{match}(w_{i+1}, t_{i+1}) & (9) \\
\quad \text{if } v_i = \_ \wedge s_i \neq \_ \wedge j \leq m \wedge j \leq n \\
(v_{j+1}, s_{j+1}) =_{match}(w_{i+1}, t_{i+1}) & (10) \\
\quad \text{if } v_i = \_ \wedge s_i = \_ \wedge j \leq m \wedge j \leq n \\
(v_{j+1}, s_{j+1}) =_{match}(w_{i+1}, t_{i+1}) \vee (v_j, s_j) =_{match}(w_{i+1}, t_{i+1}) & (11) \\
\quad \text{if } v_i = * \wedge j \leq m \wedge j \leq n
\end{cases}$$

Note that in the definition of $=_{match}$, cases (9), (10) and (11) correspond to the three different types of wildcards. Moreover, in the evaluation of the first disjunction of (11), $(v_{j+1}, s_{j+1}) =_{match} (w_{i+1}, t_{i+1})$ it must hold that $v_{j+1} \neq * \wedge s_{j+1} \neq * \wedge (v_{j+1} = \_ \wedge s_{j+1} = \_)$ due to the restriction we put on the occurrence of multi-position wildcards.

We match all patterns of all groups against every possible element $(w_i, t_i)$ of m. While doing this, we need keep track of two positions used if a pattern matches; the start position of the match in m and the end position of the match in m. The starting position is t whereas the end position is end which is assigned a value in case (1) of $=_{match}$, implying a match between the pattern and the message. We thus get a set of matching patterns containing a start position, an end position in the message m and the matched pattern itself.

$$\text{matchedPatterns} = \{(\text{start}, \text{end}, (g, [(v_1, s_1), \ldots, (v_n, s_n)])) | (v_1, s_1) =_{match}(w_{start}, t_{start})\} \quad (12)$$

Elements of matchedPatterns may subsume each other. Subsumption in this sense is defined as follows, where we say that q1 subsumes q2.

$$\exists_{(s_1, e_1, q_1), (s_2, e_2, q_2) \in matchedPatterns} : (s_1 = s_2 \wedge e_1 > e_2) \wedge q_1 \neq q_2 \quad (13)$$

All patterns that are subsumed by some other pattern are removed. Note that coinciding patterns, having the same start position as well as the same end position, are not removed but as we deal with sets, such coinciding patterns must be of different pattern groups. The resulting set maxPatterns only contains maximal patterns and is defined as follows.

$$\text{maxPatterns} = \{(s, e, q) \in \text{matched Patterns} \wedge \neg (\exists_{(s', e', q') \in matchedPatterns} : (s = s' \wedge e' > e) \wedge q \neq q')\} \quad (14)$$

Rule Application

After having collected all maximal patterns, we can apply the heuristic rules for each different pattern group. The rules formally work out the motivation for the presence of each pattern group. The order in which the rules are applied is crucial and so is the role of the action radius $\in$, defining to what extend rules affect elements in our message. We outline each of the rules in the order in which they are to be applied. We assume we are given a message m and a model (Model, $\in$) on which maxPatterns is defined. Every tuple (or element) $e_i = (w_i, t_i) \in m$ has a certain emission value $em(e_i)$ which initially is set to 0 for all $e_i \in m$.

Rule 1. Setting Stops

This rule sets emission boundaries in our message m. It uses all left flip and stop patterns and sets a stop at the starting position of such a pattern. We thus get a set of stops.

$$\text{stops} = \{s | s, f, \text{leftflip}) \in \text{Patterns} \vee (s, f, \text{stop}) \in \text{maxPatterns}\} \quad (15)$$

Rule 2. Removing Stops

Stops set in the previous step can be removed by continuator patterns. This however, only happens to the left of a continuator pattern. We thus remove all stops that occur closest to the left of a continuator pattern, taking $\in$ into account.

$$\text{stops} = \text{stops} \setminus \{t | t \in \text{stops} \wedge (\exists_{(s, f, continuator) \in maxPatterns} : t \leq s \wedge s - t < \in \wedge \neg (\exists_{w \in stops} : t < t' \leq s))\} \quad (16)$$

Rule 3. Positive Sentiment Emission

A positive pattern can emit positive sentiment among elements of m. The strength of the emission decays over distance from an element and hence we need a first decaying function. Preferably, we use $e^{-x}$ as first decaying function, where x is the distance between the positive pattern and an element of message m. As center for the emission, for each positive pattern, we take the floor of the center of the positive pattern in m, computed by taking the center of start and end position. We also need to take all stops into account. For each positive pattern, we update the sentiment emission values $em(e_i)$ of each element as follows.

$$\forall_{(s, f, positive) \in maxPatterns} : c = \left\lfloor \frac{s+f}{2} \right\rfloor \wedge \quad (17)$$

$$(\forall_{e_i \in m} : \neg (\exists_{t \in stops} : c \geq i \Rightarrow i \leq t \leq c \vee i \geq c \Rightarrow c \leq t \leq i) \Leftrightarrow$$

$$em(e_i) = em(e_i) + e^{-|c-i|})$$

This rule, thus, renders a first updated set of sentiment emission values.

Rule 4. Negative Sentiment Emission

Negative patterns are dealt with in the same way positive patterns are. The only difference is that our decaying function is now negative. The updating of emission values happens in the same manner. So, we define a negative sentiment emission value among all elements of message m. The strength of the emission decays over distance from an element and hence we need a second decaying function. Preferably, we use $-e^{-x}$ as second decaying function, where x is the distance between the negative pattern and an element of message m. As center for the emission, for each negative pattern, we take the floor of the center of the negative pattern in m, computed by taking the center of start and end position. We also need to take all stops into account. For each negative pattern, we update the sentiment emission values $em(e_i)$ as follows.

$$\forall_{(s,f,negative)\in maxPatterns}: c = \left\lfloor \frac{s+f}{2} \right\rfloor \wedge \quad (18)$$

$$(\forall_{e_i \in m}: \neg (\exists_{t \in stops}: c \geq i \Rightarrow i \leq t \leq c \vee i \geq c \Rightarrow c \leq t \leq i) \Leftrightarrow$$
$$em(e_i) = em(e_i) + -e^{-|c-i|})$$

This rule, thus, renders a second update set of sentiment emission values. Rule 5. Amplifying Sentiment—Amplifier patterns amplify sentiment emitted either by positive or negative patterns. Similar to the decaying function used for positive and negative patterns, amplification diminishes over distance. So, we define an amplifying function with decaying effect for this purpose. Moreover, since entities may already emit sentiment, we preferably implement this amplifying function as a multiplicative function instead of an additive function. The amplifying function we preferably use is $1+e^{-x}$ where x is the distance between the amplifier pattern and an element of message m. In contrast to positive and negative patterns, amplifiers adhere to the action radius $\in$. The emission values are updated as follows.

$$\forall_{(s,f,amplifier)\in maxPatterns}: c = \left\lfloor \frac{s+f}{2} \right\rfloor \wedge \quad (19)$$

$$(\forall_{e_i \in m}: (\neg (\exists_{t \in stops}: c \geq i \Rightarrow i \leq t \leq c \vee i \geq c \Rightarrow c \leq t \leq i) \wedge$$
$$0 < |c-i| < \varepsilon) \Leftrightarrow em(e_i) = em(e_i) \cdot (1+e^{-|c-i|}))$$

So, this rule takes an action radius into account, i.e., only a predetermined number of elements to the left of the left flip patterns is taken into account.
This rule, thus, renders a third set of updated sentiment emission values.

Rule 6. Attenuating Sentiment

Attenuator patterns perform the reverse of amplifier patterns and weaken sentiment. Again, similar to the decaying function used for positive and negative patterns, attenuation diminishes over distance. So, we define an attenuation function with decaying effect for this purpose. Moreover, since entities may already emit sentiment, we preferably implement this attenuation function by using $1-e^{-x}$ where x is the distance between the attenuator pattern and an element of message m. In contrast to positive and negative patterns, attenuation also adheres to the action radius $\in$. The emission values are updated as follows.

$$\forall_{(s,f,amplifier)\in maxPatterns}: c = \left\lfloor \frac{s+f}{2} \right\rfloor \wedge \quad (20)$$

$$(\forall_{e_i \in m}: (\neg (\exists_{t \in stops}: c \geq i \Leftrightarrow i \leq t \leq c \vee i \geq c \Leftrightarrow c \leq t \leq i) \wedge$$
$$0 < |c-i| < \varepsilon) \Leftrightarrow em(e_i) = em(e_i) \cdot (1-e^{-|c-i|}))$$

Note the $0<|c-i|<\in$ clause. This constraint dictates that x is at least 1 in $1-e^{-x}$, thus avoiding the case that we multiply by 0 and hence completely remove emission values.

So, this rule takes an action radius into account, i.e., only a predetermined number of elements to the left of the left flip patterns is taken into account.
This rule, thus, renders a fourth set of updated sentiment emission values.

Rule 7. Right Flipping Sentiment

Right flip patterns simply flip the emission of sentiment to their right. First, it is checked whether there are right flip patterns in the message m. If so, the fourth set of updated sentiment emission values are updated as follows. If there is a stop at the exact center of our right flip, we disregard it.

$$\forall_{(s,f,rightflip)\in maxPatterns}: c = \left\lfloor \frac{s+f}{2} \right\rfloor \wedge \quad (21)$$

$$(\forall_{e_i \in m}: (\neg (\exists_{t \in stops}: c < t \leq i) \wedge |c-i| < \varepsilon) \Leftrightarrow em(e_i) = -em(e_i))$$

So, this rule takes an action radius into account, i.e., only a predetermined number of elements to the right of the right flip patterns is taken into account. This rule, thus, renders a fifth set of updated sentiment emission values.

Rule 8. Left Flipping Sentiment

Left flip patterns mirror the effect of right flip patterns. First, it is checked whether there are left flip patterns in the message m. If so, the fifth set of updated sentiment emission values are updated as follows.

$$\forall_{(s,f,leftflip)\in maxPatterns}: c = \left\lfloor \frac{s+f}{2} \right\rfloor \wedge \quad (22)$$

$$(\forall_{e_i \in m}: (\neg (\exists_{t \in stops}: i \leq t < c) \wedge |c-i| < \varepsilon) \Leftrightarrow em(e_i) = -em(e_i))$$

So, this rule takes an action radius into account, i.e., only a predetermined number of elements to the left of the left flip patterns is taken into account. This rule, thus, renders a sixth set of updated sentiment emission values. These updated sentiment emission values are final emission values.

Once the above rules have been applied in the order given, every element $e_i$ of message m has a final emission value $em(e_i)$. The final polarity of the entire message m is defined by the sum of all final emission values for all elements of message m.

$$polarity = \sum_{i=1}^{n} em(e_i) \quad (23)$$

Straightforwardly, we say that message m is positive if and only if polarity>0. Likewise, we say that message m is negative if and only if polarity<0. Whenever polarity=0, we do not know the polarity of message m, either due to insufficient patterns present in our model or due to the absence of patterns in message m.

The final polarity is output to the user, e.g. in the form of an output message on monitor 3 or on paper in the form of a printed message by printer 23.

Alternatively to using 0 as the decision boundary, in an alternative embodiment, we use some threshold th. We then say m is positive if and only if polarity>th, negative if and only if polarity<-th and unknown otherwise.

Example 3

We demonstrate the operation of the RBEM algorithm through an unrealistic example purely designated for illustrative purposes. Consider having the model shown in Table 1.

TABLE 1

An example model for the RBEM algorithm

| PATTERN | TYPE |
| --- | --- |
| [(_, NP), (LIKE, VVZ)] | POSITIVE |
| [(MORE, RBR)] | AMPLIFIER |

The model contains two patterns of which one contains a wildcard element. We now consider the following message/like the green car more than the red car.
Represented as a list of token and POS-tag pairs we get:

$$[(w_1,t_1), \ldots, (w_{10},t_{10})] = [(I,PP),(LIKE,VVP),(THE, DT),(GREEN,JJ),CAR,NN),(MORE,RBR), (THAN,IN),(THE,DT),(RED,JJ),(CAR,NN)] \quad (24)$$

Constructing the set matchedPatterns requires us to evaluate $=_{match}$. As both patterns in our model match our message exactly once, following the definition of $=_{match}$ results in the following set.

$$\text{matchPatterns} = \{(1,2,(\text{Positive},[(\_NP),(\text{like},VVZ)])), (6,6,(\text{Amplifier},[(\text{more},RBR)]))\} \quad (25)$$

The matchedPatterns set thus contains two elements. As these two elements do not overlap, we do not need to filter out subsumed patterns. Our set maxPatterns is thus equal to matchedPatterns.

We can next apply the rules consecutively. We start with Rule 1 but as maxPatterns does not contain any stop patterns or left flip patterns, we do not need to set any stops. We also do not have any continuator patterns and hence we take no action with Rule 2. Rule 3 next requires us to emit positive sentiment for all positive patterns. As we have one such pattern, we need to emit positive sentiment once. The center c of our pattern is 1.5, since we take the floor hereof, we get c=1. This yields the emission rates shown in the Emission value 1 column of Table 2 which are exponential values of e. We skip Rule 4 as there are no negative patterns. Rule 5 next requires us to strengthen emissions as we have an amplifier pattern in our maxPatterns set. Multiplying all emission rates with 1+ $e^{-|c-1|^1}$, having a center value of c=5, yields the emission values shown in the Emission value 2 column of Table 2. Note that for amplifier patterns, we need to adhere to our emission range $\in$=4. As we have no more patterns in maxPatterns, the emission values shown in the Emission value 2 column of Table 2 are the resulting emission values.

The label is now determined by looking at the sign of the sum of all emission values. As all emission values are positive, the sign is also positive, indicating that the message's polarity is positive.

TABLE 2

Emission values for the example.

| INDEX | MESSAGE ELEMENT | INITIALLY | EMISSION VALUE 1 | EMISSION VALUE 2 |
| --- | --- | --- | --- | --- |
| 1 | (I, PP) | 0 | $e^0$ = 1.000 | 1.000 |
| 2 | (LIKE, VVP) | 0 | $e^{-1}$ = 0.368 | 0.368 |
| 3 | (THE, DT) | 0 | $e^{-2}$ = 0.135 | 0.142 |
| 4 | (GREEN, JJ) | 0 | $e^{-3}$ = 0.050 | 0.057 |
| 5 | (CAR, NN) | 0 | $e^{-4}$ = 0.018 | 0.025 |
| 6 | (MORE, RBR) | 0 | $e^{-5}$ = 0.007 | 0.013 |
| 7 | (THAN, IN) | 0 | $e^{-6}$ = 0.002 | 0.003 |
| 8 | (THE, DT) | 0 | $e^{-7}$ = 0.001 | 0.001 |
| 9 | (RED, JJ) | 0 | $e^{-8}$ = 0.000 | 0.000 |
| 10 | (CAR, NN) | 0 | $e^{-9}$ = 0.000 | 0.000 |

3 Experimental Evaluation

Extensive experiments were conducted to test the strength of our sentiment analysis method. Details of these experiments can be found in section 3 of [Tromp, Jul. 16, 2011].

4 Conclusions

In this document, we have addressed the problem of sentiment analysis on multilingual short texts typically present in social media. We presented a four-step approach to solve this problem and compared our sentiment analysis with traditional surveying.

4.1 Main Contributions

Previous work in the area of sentiment analysis traditionally focuses on one language only, usually English as the resources for English are best available. Even though many of these works can be extended to support multiple languages, this is not a trivial task and typically not included in the studies themselves. We presented a multilingual solution to sentiment analysis and demonstrate its applicability in our experiments by taking both English and Dutch into account.

For each of the four steps comprising our solution, we presented an approach to solve it. For part of speech tagging we used an existing solution. For language identification we proposed a new graph based approach called LIGA. For subjectivity detection we used an existing technique, boosting in the sense of AdaBoost ensemble learning, and applied it to subjectivity detection. For polarity detection we borrowed ideas from previous work to create the rule-based emission model (RBEM) algorithm. This newly presented approach uses eight heuristic rules to efficiently solve the polarity detection problem.

Both of the newly introduced algorithms, LIGA as well as the RBEM algorithm, provide a solid foundation that is easily extended. For LIGA one could incorporate capturing more grammar by enriching the graph.

For the RBEM algorithm, adding additional rules that further increase its accuracy is straightforward when the relation with the other rules is analyzed.

Experiments have shown how each of our chosen solutions for each step outperform other competitor approaches and achieve significant performance increase over baselines.

Summary Notes

The world wide web and more specifically social media are showing tremendous growth over recent years. The connectivity social media provide the world with allows users to more easily share experiences and influence each other through providing sentiment. The large volume of this sentiment calls for automated ways of interpretation to quickly gain insights and react as quickly as possible.

We investigate automated sentiment analysis on multilingual data from social media. As social media more and more connect the entire world, there is an increasing importance to analyze multilingual data rather than unilingual data. The automated sentiment analysis we perform extracts opinions from the relatively short messages placed on social media in multiple languages.

We present a four-step approach to perform sentiment analysis. Our approach comprises language identification, part-of-speech tagging, subjectivity detection and polarity detection. For language identification we propose an algorithm we call LIGA which captures grammar of languages in addition to occurrences of characteristics. For part-of-speech tagging we use an existing solution called the TreeTagger, developed at the University of Stuttgart. We apply AdaBoost using decision stumps to solve subjectivity detection. For polarity detection we propose an algorithm we call RBEM which uses heuristic rules to create an emissive model on patterns.

We extensively experiment with our four-step approach on the level of a single step as well as on the level of the complete process. Our single step comparisons show that our solutions perform better than other competitor solutions and baselines. We compare against approaches typically shown to be state-of-the-art in related work and baselines that are either general machine learning baselines such as a majority class guess as well as domain-specific baselines such as a prior polarity classifier.

The experiments at the level of the complete process show that each step adds to accurately solving the sentiment analysis problem. We show that by leaving a step out of the process we obtain less promising results and report the overall accuracy of our sentiment analysis being 69.2%.

Sentiment analysis can be used as an automated means to perform marketing research. The kind of marketing research currently addressing sentiment analysis uses traditional surveys to explicitly ask respondents for their opinion.

Computer Arrangement to Implement the Invention

Figure 5:
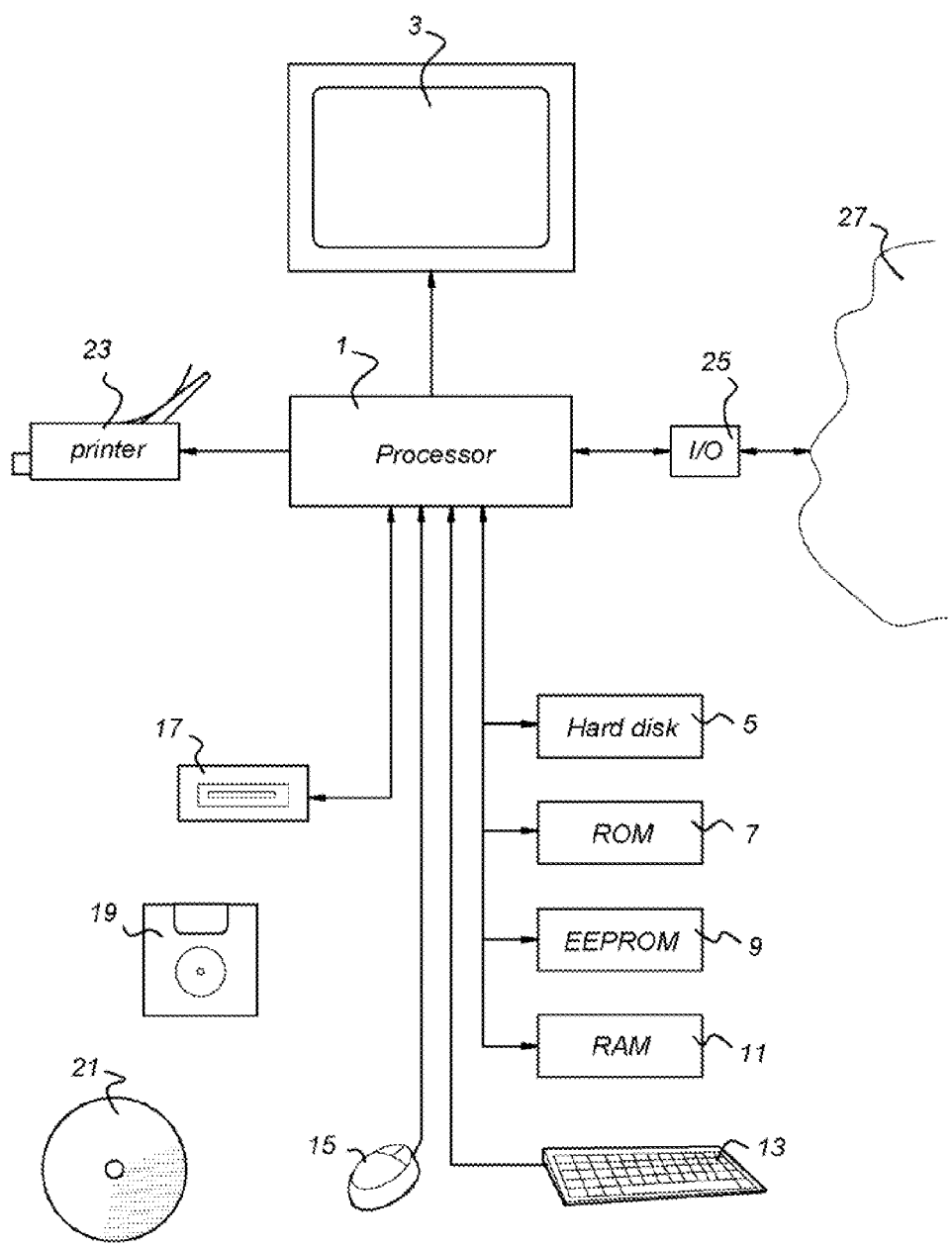
FIG. 5 is an overview of a computer arrangement that can be used to implement the invention.

In FIG. 5, an overview is given of a computer arrangement that can be used to carry out the method according to the invention. The arrangement comprises a processor 1 for carrying out arithmetic operations.

The processor 1 is connected to a plurality of memory components, including a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to units for inputting instructions, data etc. by a user, like a keyboard 13, and a mouse 15. Other input units, such as a touch screen, a track ball and/or a voice converter, known to persons skilled in the art may be provided too.

A reading unit 17 connected to the processor 1 is provided. The reading unit 17 is arranged to read data from and possibly write data on a data carrier (or computer readable medium) like a floppy disk 19 or a CDROM 21. Other data carriers may be tapes, DVD, Blu Ray disks, Compact Flash (CF), Secure Digital (SD), Micro SD, Mini SD, Extreme Digital (xD), and memory sticks, etc. as is known to persons skilled in the art. The data carrier may be provided with a computer program product comprising instructions and data arranged to be read by the processor 1 and, after being read, allowing the processor 1 to perform a method in accordance with the invention. Such a computer program product may then be loaded in one of the memory components 5, 7, 9, 11. However, such computer program product may, alternatively, be downloaded via the telecommunication network 27.

The processor 1 may be connected to a printer 23 for printing output data on paper, as well as to a display 3, for instance, a monitor or LCD (Liquid Crystal Display) screen, a plasma display panel, an Organic Light Emitting Diode (OLED), an Active Matrix OLED (AMOLED) or any other type of display known to persons skilled in the art.

The processor 1 may be connected to a communication network 27, for instance, the Public Switched Telephone Network (PSTN), a Local Area Network (LAN), a Wide Area Network (WAN), the Internet, etc. by means of an I/O unit 25. The processor 1 may be arranged to communicate with other communication arrangements through the network 27.

The processor 1 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 1 through the network 27. Implementations in which cloud computing is used are also envisaged.

The computer is arranged to run a program stored in its memory 5, 7, 9, 11. Messages to be used for the present invention may be received/downloaded from, for instance, social media on the Internet via communication network 27, or read by processor 1 from a data carrier of one of the above mentioned types. Such messages are then, after possibly be stored in memory, processed in accordance with the invention to detect whether they have positive, negative or no polarity as explained above. The data as stored in memory necessary to run the program, include the pattern groups as defined in section 2.4.2, as well as other data that may be necessary.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

Even though the following claims refer to one or less preceding claims only, their subject matter may be combined arbitrarily unless the specification above expressly explains that that is impossible.

REFERENCES

[Ahmed et al., 2004] Ahmed, B., Cha, S., and Tapped, C. (2004). Language identification from text using n-gram based cumulative frequency addition. In *Proc. CSIS '04*.

[Brill, 1992] Brill, E. (1992). A simple rule-based part of speech tagger. In *Proceedings of the third conference on Applied natural language processing*.

[Butterworth et al., 2004] Butterworth, R., Simovici, D. A., Santos, G. S., and Ohno-machado, L. (2004). A greedy algorithm for supervised discretization. In *Journal of Biomedical Informatics—Special issue: Biomedical machine learning*.

[Cavnar and Trenkle, 1994] Cavnar, W. and Trenkle, J. (1994). N-gram-based text categorization. In *Proc. 3rd Symp. on Document Analysis and Information Retrieval (SDAIR-94)*.

[Cowie et al., 1999] Cowie, J., Ludovic, Y., and Zacharski, R. (1999). Language recognition for monoand multilingual documents. In *Proc. of the Vextal Conference*.

[Cutting et al., 1992] Cutting, D., Kupiec, J. M., Pedersen, J., and Sibun, P. (1992). A practical part of-speech tagger. In *In Proceedings of the Third Conference on Applied Natural Language Processing*.

[Dougherty et al., 1995] Dougherty, J., Kohavi, R., and Sahami, M. (1995). Supervised and unsupervised discretization of continuous features. In *Proceedings of the Twelfth International Conference on Machine Learning*.

[Dunning, 1994] Dunning, T. (1994). Statistical identification of language. In *TR-MCCS-94-273, New Mexico State Univ.*

[Esuli et al., 2010] Esuli, A., Baccianella, S., and Sebastiani, F. (2010). Sentiwordnet 3.0: An enhanced lexical resource for sentiment analysis and opinion mining. In *Proceedings of the Seventh conference on International Language Resources and Evaluation LREC '10*.

[Esuli and Sebastiani, 2006] Esuli, A. and Sebastiani, F. (2006). Determining term subjectivity and term orientation for opinion mining. In *Proceedings EACL-06, the lird Conference of the European Chapter of the Association for Computational Linguistics*.

[Freund and Schapire, 1995] Freund, Y. and Schapire, R. E. (1995). A decision-theoretic generalization of on-line learning and an application to boosting.

[Go et al., 2009] Go, A., Huang, L., and Bhayani, R. (2009). Twitter sentiment analysis.

[Goldwater and Griffiths, 2007] Goldwater, S. and Griffiths, T. L. (2007). A fully bayesian approach to unsupervised part-of-speech tagging. In *Proceedings of the 45th Annual Meeting of the Association of Computational Linguistics*.

[Harper and Teahan, 2001] Harper, D. and Teahan, W. (2001). Using compression-based language models for text categorization. In *Proc. Workshop on Language Modeling and Information Retrieval*.

[Hatzivassiloglou and McKeown, 1997] Hatzivassiloglou, V. and McKeown, K. (1997). Predicting the semantic orientation of adjectives. In *Proceedings of the ACL*, pages 174-181.

[Joachims, 1998] Joachims, T. (1998). Text categorization with support vector machines: Learning with many relevant features. In *Proceedings of the European Conference on Machine Learning (EC*114-4.

[Joachims, 1999] Joachims, T. (1999). *Making large-scale support vector machine learning practical. Advances in Kernel Methods—Support Vector Learning*. MIT Press Cambridge. B. Schlkopf and C. Burges and A. Smola.

[Kupiec, 1992] Kupiec, J. M. (1992). Robust part-of-speech tagging using a hidden markov model. In *Computer Speech and Language, Vol. 6*.

[Lafferty et al., 2001] Lafferty, J., McCallum, A., and Pereira, F. (2001). Conditional random fields: Probabilistic models for segmenting and labeling sequence data. In *Proc. 18th International Conf. on Machine Learning*.

[Martino and Paulsen, 1996] Martino, M. and Paulsen, R. (1996). Natural language determination using partial words. In U.S. Pat. No. 6,216,102 E31.

[O'Connor et al., 2010] O'Connor, B., Balasubramanyan, R., Routledge, B. R., and Smith, N. A. (2010). From tweets to polls: Linking text sentiment to public opinion time series. In *Proceedings of the International AAAI Conference on Weblogs and Social Media*.

[Pak and Paroubek, 2010] Pak, A. and Paroubek, P. (2010). Twitter as a corpus for sentiment analysis and opinion mining. In *Proceedings of LREC 2010*.

[Pang and Lee, 2004] Pang, B. and Lee, L. (2004). A sentimental education: Sentiment analysis using subjectivity summarization based on minimum cuts. In *Proceedings of the ACL*, pages 271-278.

[Pang and Lee, 2008] Pang, B. and Lee, L. (2008). Opinion mining and sentiment analysis. In *Foundations and Trends in Information Retrieval* 2(1-2).

[Pang et al., 2002] Pang, B., Lee, L., and Vaithyanathan, S. (2002). Thumbs up? sentiment classification using machine learning techniques. In *Proceedings of EMNLP02*.

[Potena and Diamantini, 2010] Potena, D. and Diamantini, C. (2010). Mining opinions on the basis of their affectivity. In 2010 *International Symposium on Collaborative Technologies and Systems (CTS)*, pages 245-254.

[Prager, 1999] Prager, J. (1999). Linguini: Language identification for multilingual documents. In *Proc. 32nd Hawaii Int. Conf. on System Sciences*.

[Quinland, 1983] Quinland, J. (1983). Learning efficient classification procedures and their application to chess end games. In *Machine Learning: An Artificial Intelligence Approach*. Edited by R. S. Michalski and J. G. Carbonell and T. M. Mitchell.

[Quirk et al., 1985] Quirk, R., Greenbaum, S., Leech, G., and Svartvik, J. (1985). *A Comprehensive Grammar of the English Language*. Longman, London.

[Read, 2005] Read, J. (2005). Using emoticons to reduce dependency in machine learning techniques for sentiment classification. In *ACLstudent '05 Proceedings of the ACL Student Research Workshop*.

[Riloff et al., 2003] Riloff, E., Wiebe, J., and Wilson, T. (2003). Learning subjective nouns using extraction pattern bootstrapping. In *Proceedings of the 7th Conference on Natural Language Learning*, pages 25-32.

[Schapire and Singer, 2000] Schapire, R. E. and Singer, Y. (2000). Boostexter: A boosting-based system for text categorization. In *Machine Learning*.

[Schmid, 1994] Schmid, H. (1994). Probabilistic part-of-speech tagging using decision trees. In *International Conference on New Methods in Language Processing*.

[Sindhwani and Melville, 2008] Sindhwani, V. and Melville, P. (2008). Document-word co-regularization for semi-supervised sentiment analysis. In *Eighth IEEE International Conference on Data Mining*.

[Tromp and Pechenizkiy, 2011] Tromp, E. and Pechenizkiy, M. (2011). Graph-based n-gram language identification on short texts. In *Proceedings of the 20th Machine Learning conference of Belgium and The Netherlands*.

[Tromp, Jul. 16, 2011] Tromp, E. (2011). Multilingual Sentiment Analysis on Social Media, Master's Thesis, Department of Mathematics and Computer Sciences, Eindhoven University of Technology.

[Wiebe and Micalcea, 2006] Wiebe, J. and Micalcea, R. (2006). Word sense and subjectivity. In *Proceedings of ACL06*.

[Wiebe et al., 2005] Wiebe, J., Wilson, T., and Cardie, C. (2005). Annotating expressions of opinions and emotions in language. language resources and evaluation. In *Language Resources and Evaluation (formerly Computers and the Humanities)*.

[Wilson et al., 2005] Wilson, T., Wiebe, J., and Hoffmann, P. (2005). Recognizing contextual polarity in phrase-level sentiment analysis. In *HLT '05: Proceedings of the conference on Human Language Technology and Empirical Methods in Natural Language Processing*.

Overview of Tags: Penn Treebank II Tags

Bracket Labels

Clause Level

S—simple declarative clause, i.e. one that is not introduced by a (possible empty) subordinating conjunction or a wh-word and that does not exhibit subject-verb inversion.

SBAR—Clause introduced by a (possibly empty) subordinating conjunction.

SBARQ—Direct question introduced by a wh-word or a wh-phrase. Indirect questions and relative clauses should be bracketed as SBAR, not SBARQ.

SINV—Inverted declarative sentence, i.e. one in which the subject follows the tensed verb or modal.

SQ—Inverted yes/no question, or main clause of a wh-question, following the wh-phrase in SBARQ.

Phrase Level
- ADJP—Adjective Phrase.
- ADVP—Adverb Phrase.
- CONJP—Conjunction Phrase.
- FRAG—Fragment.
- INTJ—Interjection. Corresponds approximately to the part-of-speech tag UH.
- LST—List marker. Includes surrounding punctuation.
- NAC—Not a Constituent; used to show the scope of certain prenominal modifiers within an NP.
- NP—Noun Phrase.
- NX—Used within certain complex NPs to mark the head of the NP. Corresponds very roughly to N-bar level but used quite differently.
- PP—Prepositional Phrase.
- PRN—Parenthetical.
- PRT—Particle. Category for words that should be tagged RP.
- QP—Quantifier Phrase (i.e. complex measure/amount phrase); used within NP.
- RRC—Reduced Relative Clause.
- UCP—Unlike Coordinated Phrase.
- VP—Vereb Phrase.
- WHADJP—Wh-adjective Phrase. Adjectival phrase containing a wh-adverb, as in how hot.
- WHAVP—Wh-adverb Phrase. Introduces a clause with an NP gap. May be null (containing the 0 complementizer) or lexical, containing a wh-adverb such as how or why.
- WHNP—Wh-noun Phrase. Introduces a clause with an NP gap. May be null (containing the 0 complementizer) or lexical, containing some wh-word, e.g. who, which book, whose daughter, none of which, or how many leopards.
- WHPP—Wh-prepositional Phrase. Prepositional phrase containing a wh-noun phrase (such as of which or by whose authority) that either introduces a PP gap or is contained by a WHNP.
- X—Unknown, uncertain, or unbracketable. X is often used for bracketing typos and in bracketing the . . . the-constructions.

Word Level
- CC—Coordinating conjunction
- CD—Cardinal number
- DT—Determiner
- EX—Existential there
- FW—Foreign word
- IN—Preposition or subordinating conjunction
- JJ—Adjective
- JJR—Adjective, comparative
- JJS—Adjective, superlative
- LS—List item marker
- MD—Modal
- NN—Noun, singular or mass
- NNS—Noun, plural
- NNP—Proper noun, singular
- NNPS—Proper noun, plural
- PDT—Predeterminer
- POS—Possessive ending
- PRP—Personal pronoun
- PRP$—Possessive pronoun (prolog version PRP-S)
- RB—Adverb
- RBR—Adverb, comparative
- RBS—Adverb, superlative
- RP—Particle
- SYM—Symbol
- TO—to
- UH—Interjection
- VB—Verb, base form
- VBD—Verb, past tense
- VBG—Verb, gerund or present participle
- VBN—Verb, past participle
- VBP—Verb, non-3rd person singular present
- VBZ—Verb, 3rd person singular present
- WDT—Wh-determiner
- WP—Wh-pronoun
- WP$—Possessive wh-pronoun (prolog version WP-S)
- WRB—Wh-adverb Function Tags
Form/Function Discrepancies
- -ADV (adverbial)—marks a constituent other than ADVP or PP when it is used adverbially (e.g. NPs or free ("headless") relatives). However, constituents that themselves are modifying an ADVP generally do not get -ADV. If a more specific tag is available (for example, -TMP) then it is used alone and -ADV is implied. See the Adverbials section.
- -NOM (nominal)—marks free ("headless") relatives and gerunds when they act nominally.

Grammatical Role
- -DTV (dative)—marks the dative object in the unshifted form of the double object construction. If the preposition introducing the "dative" object is for, it is considered benefactive (-BNF). -DTV (and -BNF) is only used after verbs that can undergo dative shift.
- -LGS (logical subject)—is used to mark the logical subject in passives. It attaches to the NP object of by and not to the PP node itself.
- -PRD (predicate)—marks any predicate that is not VP. In the do so construction, the so is annotated as a predicate.
- -PUT—marks the locative complement of put.
- -SBJ (surface subject)—marks the structural surface subject of both matrix and embedded clauses, including those with null subjects.
- -TPC ("topicalized")—marks elements that appear before the subject in a declarative sentence, but in two cases only:
  1. if the front element is associated with a *T* in the position of the gap.
  2. if the fronted element is left-dislocated (i.e. it is associated with a resumptive pronoun in the position of the gap).
- -VOC (vocative)—marks nouns of address, regardless of their position in the sentence. It is not coindexed to the subject and not get -TPC when it is sentence-initial.

Adverbials
Adverbials are generally VP adjuncts.
- -BNF (benefactive)—marks the beneficiary of an action (attaches to NP or PP). This tag is used only when (1) the verb can undergo dative shift and (2) the prepositional variant (with the same meaning) uses for. The prepositional objects of dative-shifting verbs with other prepositions than for (such as to or of) are annotated DTV.
- -DIR (direction)—marks adverbials that answer the questions "from where?" and "to where?" It implies motion, which can be metaphorical as in " . . . rose 5 pts. to 57½" or "increased 70% to 5.8 billion yen"-DIR is most often used with verbs of motion/transit and financial verbs.
- -EXT (extent)—marks adverbial phrases that describe the spatial extent of an activity. -EXT was incorporated primarily for cases of movement in financial space, but is also used in analogous situations elsewhere. Obligatory complements do not receive -EXT. Words such as fully and completely are absolutes and do not receive -EXT.
- -LOC (locative)—marks adverbials that indicate place/setting of the event. -LOC may also indicate metaphorical location. There is likely to be some variation in the use of -LOC due to differing annotator interpretations. In cases where the annotator is faced with a choice between -LOC or -TMP, the default is -LOC. In cases involving SBAR, SBAR should not receive -LOC. -LOC has some uses that are not adverbial, such as with place names that are adjoined to other NPs and NAC-LOC premodifiers of NPs. The special tag -PUT is used for the locative argument of put.

-MNR (manner)—marks adverbials that indicate manner, including instrument phrases.

-PRP (purpose or reason)—marks purpose or reason clauses and PPs.

-TMP (temporal)—marks temporal or aspectual adverbials that answer the questions when, how often, or how long. It has some uses that are not strictly adverbial, such as with dates that modify other NPs at S- or VP-level. In cases of apposition involving SBAR, the SBAR should not be labeled -TMP. Only in "financialspeak," and only when the dominating PP is a PP-DIR, may temporal modifiers be put at PP object level. Note that -TMP is not used in possessive phrases.

Miscellaneous

-CLR (closely related)—marks constituents that occupy some middle ground between arguments and adjunct of the verb phrase. These roughly correspond to "predication adjuncts", prepositional ditransitives, and some "phrasel verbs". Although constituents marked with -CLR are not strictly speaking complements, they are treated as complements whenever it makes a bracketing difference. The precise meaning of -CLR depends somewhat on the category of the phrase.

on S or SBAR—These categories are usually arguments, so the -CLR tag indicates that the clause is more adverbial than normal clausal arguments. The most common case is the infinitival semi-complement of use, but there are a variety of other cases.

on PP, ADVP, SBAR-PRP, etc—On categories that are ordinarily interpreted as (adjunct) adverbials, -CLR indicates a somewhat closer relationship to the verb. For example:

Prepositional Ditransitives
In order to ensure consistency, the Treebank recognizes only a limited class of verbs that take more than one complement (-DTV and -PUT and Small Clauses) Verbs that fall outside these classes (including most of the prepositional ditransitive verbs in class [D2]) are often associated with -CLR.

Phrasal verbs
Phrasal verbs are also annotated with -CLR or a combination of -PRT and PP-CLR. Words that are considered borderline between particle and adverb are often bracketed with ADVP-CLR.

Predication Adjuncts
Many of Quirk's predication adjuncts are annotated with -CLR.

on NP—To the extent that -CLR is used on NPs, it indicates that the NP is part of some kind of "fixed phrase" or expression, such as take care of. Variation is more likely for NPs than for other uses of -CLR.

-CLF (cleft)—marks it-clefts ("true clefts") and may be added to the labels S, SINV, or SQ.

-HLN (headline)—marks headlines and datelines. Note that headlines and datelines always constitute a unit of text that is structurally independent from the following sentence.

-TTL (title)—is attached to the top node of a title when this title appears inside running text. -TTL implies -NOM. The internal structure of the title is bracketed as usual.

The invention claimed is:

1. A computer arrangement provided with a processor and memory, the memory storing a computer program comprising instructions and data, the processor being arranged to read said instructions and data from said memory and to run said computer program, said memory comprising:
a set of patterns, each pattern including a combination of one or more words and one or more part-of-speech tags, said set of patterns including at least:
positive patterns which are associated with positive sentiment when taken out of context,
negative patterns which are associated with negative sentiment when taken out of context,
amplifier patterns which strengthen positive and negative sentiment of n entities to their right and left in a message,
attenuator patterns which weaken positive and negative sentiment of n entities to their right and left in a message,
right flip patterns which flip positive and negative sentiment of n entities to their right in a message,
left flip patterns which flip positive and negative sentiment of n entities to their left in a message,
continuator patterns which continue emission of positive and negative sentiment, and
stop patterns which interrupt emission of positive and negative sentiment; and
wherein when running said computer program in order to detect a polarity of a sentiment in a particular message having a plurality of words, said processor is configured to perform actions comprising:
representing said particular message as a list of tuples, each tuple comprising a word and an associated part-of-speech tag, each tuple having an initial sentiment emission value;
comparing all tuples of said list of tuples with said set of patterns and producing a set of matching patterns, each matching pattern comprising a start position in said particular message, an end position in said particular message and a pattern selected from said set of patterns that matches a tuple;
setting stops in said particular message, stops being defined as sentiment emission boundaries in said particular message, by setting a stop at a starting position of each left flip pattern and at the starting position of each stop pattern;
updating for each tuple its sentiment emission value based on positive patterns present in said particular message by applying a first decaying function on each sentiment emission value which first decaying function takes distance between each positive pattern and each tuple of said particular message into account, rendering a first updated set of sentiment emission values;
updating said first updated set of sentiment emission values based on negative patterns present in said particular message by applying a second decaying function on each sentiment emission value of said first updated set of sentiment emission values which second decaying function takes distance between each negative pattern and each tuple of said particular message into account, rendering a second updated set of sentiment emission values;
updating said second updated set of sentiment emission values based on amplifier patterns present in said particular message by applying an amplifying function on each sentiment emission value of said second updated set of sentiment emission values which amplifying function takes distance between each amplifier pattern and each tuple of said particular message into account, rendering a third updated set of sentiment emission values;

updating said third updated set of sentiment emission values based on attenuator patterns present in said particular message by applying an attenuation function on each sentiment emission value of said third updated set of sentiment emission values which attenuation function takes distance between each attenuator pattern and each tuple of said particular message into account, rendering a fourth updated set of sentiment emission values;

updating said fourth updated set of sentiment emission values based on right flip patterns present in said particular message by flipping each sentiment emission value of said fourth updated set of sentiment emission values of those tuples of said particular message that are within a certain distance to the right of said right flip patterns, rendering a fifth updated set of sentiment emission values;

updating said fifth updated set of sentiment emission values based on left flip patterns present in said particular message by flipping each sentiment emission value of said fifth updated set of sentiment emission values of those tuples of said particular message that are within a certain distance to the left of said left flip patterns, rendering a sixth updated set of sentiment emission values; and calculating a final polarity of said particular message by adding all sentiment emission values of said sixth updated set of sentiment emission values.

2. The computer arrangement of claim 1, wherein said actions comprises the following action after setting said stops:

removing stops that occur within a certain distance to the left of continuator patterns in said particular message.

3. The computer arrangement of claim 1, wherein said first decaying function is $e^{-x}$, where x is distance between each positive pattern and each tuple of said particular message, and said second decaying function is $-e^{-x}$, where x is distance between each negative pattern and each tuple of said particular message.

4. The computer arrangement of claim 1, wherein said amplifying function is $1+e^{-x}$, where x is distance between each amplifier pattern and each tuple of said particular message, and said attenuation function is $1-e^{-x}$, where x is distance between each attenuator pattern and each tuple of said particular message.

5. The computer arrangement of claim 1, wherein said particular message is derived from a social media source on the internet.

6. The computer arrangement of claim 1, wherein said computer program allows said processor to perform said actions on messages from several languages.

7. A non-transitory computer readable storage medium embodying instructions executable by a processor to detect a polarity of a sentiment in a message, by using a set of patterns stored in a memory, each pattern including a combination of one or more words and one or more part-of-speech tags, said set of patterns including at least:

positive patterns which are associated with positive sentiment when taken out of context, negative patterns which are associated with negative sentiment when taken out of context, amplifier patterns which strengthen positive and negative sentiment of n entities to their right and left in a message, attenuator patterns which weaken positive and negative sentiment of n entities to their right and left in a message, right flip patterns which flip positive and negative sentiment of n entities to their right in a message, left flip patterns which flip positive and negative sentiment of n entities to their left in a message, continuator patterns which continue emission of positive and negative sentiment, and stop patterns which interrupt emission of positive and negative sentiment; and wherein to detect said polarity of said sentiment in a particular message having a plurality of words, the non-transitory computer readable storage medium includes instructions stored thereon which when executed cause the processor to perform the steps comprising:

representing said particular message as a list of tuples, each tuple comprising a word and an associated part-of-speech tag, each tuple having an initial sentiment emission value;

comparing all tuples of said list of tuples with said set of patterns and producing a set of matching patterns, each matching pattern comprising a start position in said particular message, an end position in said particular message and a pattern selected from said set of patterns matching a tuple;

setting stops in said particular message, stops being defined as sentiment emission boundaries in said particular message, by setting a stop at a starting position of each left flip pattern and at the starting position of each stop pattern;

updating for each tuple its sentiment emission value based on positive patterns present in said particular message by applying a first decaying function on each sentiment emission value which first decaying function takes distance between each positive pattern and each tuple of said particular message into account, rendering a first updated set of sentiment emission values;

updating said first updated set of sentiment emission values based on negative patterns present in said particular message by applying a second decaying function on each sentiment emission value of said first updated set of sentiment emission values which second decaying function takes distance between each negative pattern and each tuple of said particular message into account, rendering a second updated set of sentiment emission values;

updating said second updated set of sentiment emission values based on amplifier patterns present in said particular message by applying an amplifying function on each sentiment emission value of said second updated set of sentiment emission values which amplifying function takes distance between each amplifier pattern and each tuple of said particular message into account, rendering a third updated set of sentiment emission values;

updating said third updated set of sentiment emission values based on attenuator patterns present in said particular message by applying an attenuation function on each sentiment emission value of said third updated set of sentiment emission values which attenuation function takes distance between each attenuator pattern and each tuple of said particular message into account, rendering a fourth updated set of sentiment emission values;

updating said fourth updated set of sentiment emission values based on right flip patterns present in said particular message by flipping each sentiment emission value of said fourth updated set of sentiment emission values of those tuples of said particular message that are within a certain distance to the right of said right flip patterns, rendering a fifth updated set of sentiment emission values;

updating said fifth updated set of sentiment emission values based on left flip patterns present in said particular message by flipping each sentiment emission value of said fifth updated set of sentiment emission values of those tuples of said particular message that are within a certain distance to the left of said left flip patterns, rendering a sixth updated set of sentiment emission values; and calculating a final polarity of said particular message by adding all sentiment emission values of said sixth updated set of sentiment emission values.

8. A computer implemented method executable by a processor for detecting a polarity of a sentiment in a message, by using a set of patterns stored in a memory, each pattern including a combination of one or more words and one or more part-of-speech tags, said set of patterns including at least:

positive patterns which are associated with positive sentiment when taken out of context, negative patterns which are associated with negative sentiment when taken out of context, amplifier patterns which strengthen positive and negative sentiment of n entities to their right and left in a message, attenuator patterns which weaken positive and negative sentiment of n entities to their right and left in a message, right flip patterns which flip positive and negative sentiment of n entities to their right in a message, left flip patterns which flip positive and negative sentiment of n entities to their left in a message, continuator patterns which continue emission of positive and negative sentiment, and stop patterns which interrupt emission of positive and negative sentiment; and wherein to detect said polarity of said sentiment in a particular message having a plurality of words, said computer implement method comprises the steps of:

representing said particular message as a list of tuples, each tuple comprising a word and an associated part-of-speech tag, each tuple having an initial sentiment emission value;

comparing all tuples of said list of tuples with said set of patterns and producing a set of matching patterns, each matching pattern comprising a start position in said particular message, an end position in said particular message and a pattern selected from said set of patterns matching a tuple;

setting stops in said particular message, stops being defined as sentiment emission boundaries in said particular message, by setting a stop at a starting position of each left flip pattern and at the starting position of each stop pattern;

updating for each tuple its sentiment emission value based on positive patterns present in said particular message by applying a first decaying function on each sentiment emission value which first decaying function takes distance between each positive pattern and each tuple of said particular message into account, rendering a first updated set of sentiment emission values;

updating said first updated set of sentiment emission values based on negative patterns present in said particular message by applying a second decaying function on each sentiment emission value of said first updated set of sentiment emission values which second decaying function takes distance between each negative pattern and each tuple of said particular message into account, rendering a second updated set of sentiment emission values;

updating said second updated set of sentiment emission values based on amplifier patterns present in said particular message by applying an amplifying function on each sentiment emission value of said second updated set of sentiment emission values which amplifying function takes distance between each amplifier pattern and each tuple of said particular message into account, rendering a third updated set of sentiment emission values;

updating said third updated set of sentiment emission values based on attenuator patterns present in said particular message by applying an attenuation function on each sentiment emission value of said third updated set of sentiment emission values which attenuation function takes distance between each attenuator pattern and each tuple of said particular message into account, rendering a fourth updated set of sentiment emission values;

updating said fourth updated set of sentiment emission values based on right flip patterns present in said particular message by flipping each sentiment emission value of said fourth updated set of sentiment emission values of those tuples of said particular message that are within a certain distance to the right of said right flip patterns, rendering a fifth updated set of sentiment emission values;

updating said fifth updated set of sentiment emission values based on left flip patterns present in said particular message by flipping each sentiment emission value of said fifth updated set of sentiment emission values of those tuples of said particular message that are within a certain distance to the left of said left flip patterns, rendering a sixth updated set of sentiment emission values; and calculating a final polarity of said particular message by adding all sentiment emission values of said sixth updated set of sentiment emission values.

9. The non-transitory computer readable storage medium of claim 7, further including instructions stored thereon which when executed cause the processor to perform, after setting said stops, the steps comprising:

removing stops that occur within a certain distance to the left of continuator patterns in said particular message.

10. The non-transitory computer readable storage medium of claim 7, wherein said first decaying function is $e^{-x}$, where x is distance between each positive pattern and each tuple of said particular message, and said second decaying function is $-e^{-x}$, where x is distance between each negative pattern and each tuple of said particular message.

11. The non-transitory computer readable storage medium of claim 7, wherein said amplifying function is $1+e^{-x}$, where x is distance between each amplifier pattern and each tuple of said particular message, and said attenuation function is $1-e^{-x}$, where x is distance between each attenuator pattern and each tuple of said particular message.

12. The non-transitory computer readable storage medium of claim 7, wherein said particular message is derived from a social media source on the internet.

13. The non-transitory computer readable storage medium of claim 7, wherein a polarity of a sentiment of a message is detectable for messages from several languages.

14. The computer implemented method of claim 8, wherein said method further comprises the following after setting said stops:
   removing stops that occur within a certain distance to the left of continuator patterns in said particular message.

15. The computer implemented method of claim 8, wherein said first decaying function is $e^{-x}$, where x is distance between each positive pattern and each tuple of said particular message, and said second decaying function is $-e^{-x}$, where x is distance between each negative pattern and each tuple of said particular message.

16. The computer implemented method of claim 8, wherein said amplifying function is $1+e^{-x}$, where x is distance between each amplifier pattern and each tuple of said particular message, and said attenuation function is $1-e^{-x}$, where x is distance between each attenuator pattern and each tuple of said particular message.

17. The computer implemented method of claim 8, wherein said particular message is derived from a social media source on the internet.

18. The computer implemented method of claim 8, wherein said method is performable on messages from several languages.

\* \* \* \* \*